(12) United States Patent
Shibayama et al.

(10) Patent No.: US 11,635,789 B2
(45) Date of Patent: Apr. 25, 2023

(54) ELECTRONIC APPARATUS AND HINGE DEVICE

(71) Applicant: Lenovo (Singapore) Pte. Ltd., Singapore (SG)

(72) Inventors: Yoshiyuki Shibayama, Kanagawa (JP); Kazuyuki Kubota, Kanagawa (JP); Eiji Shinohara, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 21 days.

(21) Appl. No.: 17/358,847

(22) Filed: Jun. 25, 2021

(65) Prior Publication Data

US 2022/0026960 A1 Jan. 27, 2022

(30) Foreign Application Priority Data

Jul. 22, 2020 (JP) .............................. JP2020-125035

(51) Int. Cl.
*G06F 1/16* (2006.01)

(52) U.S. Cl.
CPC .......... *G06F 1/1681* (2013.01); *G06F 1/1618* (2013.01)

(58) Field of Classification Search
None
See application file for complete search history.

(56) References Cited

U.S. PATENT DOCUMENTS

| | | | | |
|---|---|---|---|---|
| 8,064,970 B2* | 11/2011 | Gaddy | ................. | H04M 1/022 455/575.8 |
| 8,142,926 B2* | 3/2012 | Ke | ..................... | H01M 50/213 429/96 |
| 8,982,542 B2* | 3/2015 | Bohn | .................... | G06F 1/1681 361/679.28 |
| 9,725,939 B2* | 8/2017 | Adair | ................. | E05D 11/0081 |
| 10,152,095 B2* | 12/2018 | Lin | ...................... | H05K 5/0226 |
| 10,435,933 B2* | 10/2019 | Lin | ...................... | H05K 5/0017 |
| 10,480,225 B1* | 11/2019 | Hsu | .......................... | E05D 3/12 |
| 10,501,973 B2* | 12/2019 | Määttä | .................. | G06F 1/1681 |

(Continued)

FOREIGN PATENT DOCUMENTS

| JP | S57-109162 U | 7/1982 |
|---|---|---|
| JP | 2011-61692 A | 3/2011 |

(Continued)

OTHER PUBLICATIONS

Office Action issued in corresponding Japanese Patent Application No. 2020-125035 dated Jun. 15, 2021 (5 pages).

*Primary Examiner* — Anthony Q Edwards
*Assistant Examiner* — Rashen E Morrison
(74) *Attorney, Agent, or Firm* — Osha Bergman Watanabe & Burton LLP

(57) ABSTRACT

An electronic apparatus includes: a first chassis; a second chassis; a first display provided on an upper surface of the first chassis; a second display provided on an upper surface of the second chassis; and a hinge device that connects the first chassis and the second chassis. The hinge device includes: a first bracket including a first fixing plate fixed to the first chassis; a second bracket including a second fixing plate fixed to the second chassis; a first hinge block that supports a first upper hinge shaft and a first lower hinge shaft arranged vertically between adjacent end surfaces of the first chassis and the second chassis in a flat plate form; and a second hinge block.

11 Claims, 19 Drawing Sheets

(56) References Cited

U.S. PATENT DOCUMENTS

| | | | |
|---|---|---|---|
| 10,732,677 B2* | 8/2020 | Gopalan | H04M 1/02 |
| 10,775,852 B2* | 9/2020 | Kim | G06F 1/1681 |
| 11,054,865 B2* | 7/2021 | Jan | G06F 1/1618 |
| 2008/0289146 A1* | 11/2008 | Chen | E05D 3/186 |
| | | | 16/372 |
| 2012/0090135 A1* | 4/2012 | Soh | E05F 1/1253 |
| | | | 16/250 |
| 2014/0187296 A1* | 7/2014 | Sano | H04M 1/0216 |
| | | | 455/575.3 |
| 2018/0166842 A1* | 6/2018 | Siddiqui | F16C 11/04 |
| 2018/0210499 A1* | 7/2018 | Tsubaki | G06F 1/1616 |
| 2018/0341295 A1* | 11/2018 | Lan | G06F 1/1679 |
| 2019/0146560 A1* | 5/2019 | Jan | H05K 5/0017 |
| | | | 361/679.27 |

FOREIGN PATENT DOCUMENTS

| | | |
|---|---|---|
| JP | 6023228 B2 | 11/2016 |
| JP | 2017-155854 A | 9/2017 |

* cited by examiner

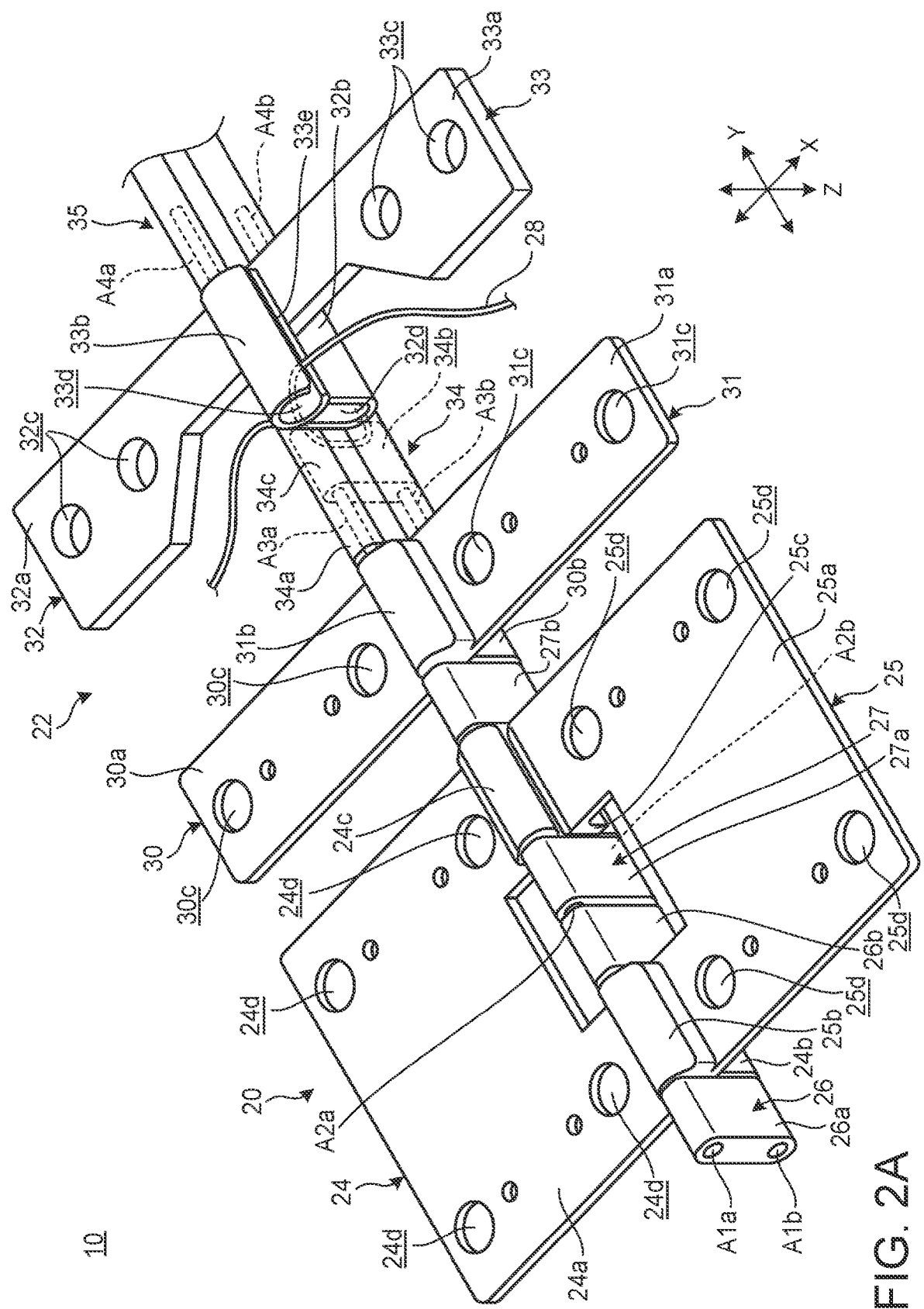

ELECTRONIC APPARATUS AND HINGE DEVICE

CROSS-REFERENCE TO RELATED APPLICATIONS

This application claims priority to Japanese Patent Application No. 2020-125035 filed on Jul. 22, 2020. The entire disclosure of this application is incorporated herein by reference.

TECHNICAL FIELD

The present invention relates to an electronic apparatus in which chassis are rotatably connected by a hinge device, and a hinge device.

BACKGROUND

Electronic apparatuses having touch-panel liquid crystal displays without physical keyboards, such as tablet PCs and smartphones, have rapidly come into wide use in recent years. The display in this type of electronic apparatus is desired to be large during use but compact during carrying.

In Japanese Patent No. 6023228, the applicant proposes an electronic apparatus in which a pair of chassis each having a display mounted therein are rotatably connected. When carrying or storing the electronic apparatus, the chassis can be closed to be compact. When using the electronic apparatus, the chassis can be opened flat to use the two displays as one large screen.

In the structure in Japanese Patent No. 6023228, a hinge shaft is located at approximately center in the thickness direction of each chassis. Since the hinge shaft does not project onto the surface of either chassis, the chassis can be reduced in thickness. Moreover, by rotating the chassis from the 0° position to the 360° position, various use modes can be realized. However, the adjacent end surfaces of the chassis are each arc-shaped in a side view to avoid interference during rotation operation, so that the gap between the two displays increases. Thus, when the two displays are used as one large screen, a wide separation part forms at the center of the display.

SUMMARY OF THE INVENTION

One or more embodiments provide an electronic apparatus and a hinge device that can, even in a structure in which chassis each having a display are rotatably connected, reduce the gap between the displays.

An electronic apparatus according to one aspect includes: a first chassis; a second chassis adjacent to the first chassis; a first display provided on an upper surface of the first chassis; a second display provided on an upper surface of the second chassis; and a hinge device that connects the first chassis and the second chassis so as to be relatively rotatable at least from a folded form in which the first chassis and the second chassis are laminated to overlap in a surface normal direction to a flat plate form in which the first chassis and the second chassis are arranged in a direction perpendicular to the surface normal direction, wherein the hinge device includes: a first bracket including a first fixing plate fixed to the first chassis; a second bracket including a second fixing plate fixed to the second chassis; a first hinge block that supports a first upper hinge shaft and a first lower hinge shaft arranged vertically between adjacent end surfaces of the first chassis and the second chassis in the flat plate form; and a second hinge block that is arranged side by side with the first hinge block in an axial direction of the first upper hinge shaft and the first lower hinge shaft, and supports a second upper hinge shaft and a second lower hinge shaft arranged vertically between the adjacent end surfaces in the flat plate form, wherein in the flat plate form, the first upper hinge shaft and the second upper hinge shaft are coaxial, wherein in the flat plate form, the first lower hinge shaft and the second lower hinge shaft are coaxial, wherein the first bracket further includes: a first lower arm connected to the first lower hinge shaft to be connected rotatably relative to the first hinge block; and a first upper arm connected to the second upper hinge shaft to be connected rotatably relative to the second hinge block, and wherein the second bracket further includes: a second upper arm connected to the first upper hinge shaft to be connected rotatably relative to the first hinge block; and a second lower arm connected to the second lower hinge shaft to be connected rotatably relative to the second hinge block.

A hinge device according to another aspect is a hinge device configured to relatively rotatably connect a first chassis and a second chassis in an electronic apparatus, the hinge device including: a first bracket including a first fixing plate configured to be fixed to the first chassis; a second bracket including a second fixing plate configured to be fixed to the second chassis, the second fixing plate being rotatable relative to the first fixing plate at least from a folded form in which the first chassis and the second chassis are laminated to overlap in a surface normal direction to a flat plate form in which the first chassis and the second chassis are arranged in a direction perpendicular to the surface normal direction; a first hinge block that supports a first upper hinge shaft and a first lower hinge shaft arranged vertically in the flat plate form; and a second hinge block that is arranged side by side with the first hinge block in an axial direction of the first upper hinge shaft and the first lower hinge shaft, and supports a second upper hinge shaft and a second lower hinge shaft arranged vertically in the flat plate form, wherein in the flat plate form, the first upper hinge shaft and the second upper hinge shaft are coaxial, wherein in the flat plate form, the first lower hinge shaft and the second lower hinge shaft are coaxial, wherein the first bracket further includes: a first lower arm connected to the first lower hinge shaft to be connected rotatably relative to the first hinge block; and a first upper arm connected to the second upper hinge shaft to be connected rotatably relative to the second hinge block, and wherein the second bracket further includes: a second upper arm connected to the first upper hinge shaft to be connected rotatably relative to the first hinge block; and a second lower arm connected to the second lower hinge shaft to be connected rotatably relative to the second hinge block.

One or more embodiments of the present invention can, even in a structure in which chassis each having a display are rotatably connected, reduce the gap between the displays.

BRIEF DESCRIPTION OF THE DRAWINGS

FIG. 2A is a main part enlarged perspective view illustrating the state of the hinge device in a 180° posture.

DETAILED DESCRIPTION

An electronic apparatus and a hinge device according to embodiments of the present invention will be described in detail below by way of preferred embodiments, with reference to the attached drawings.

Figure 1:
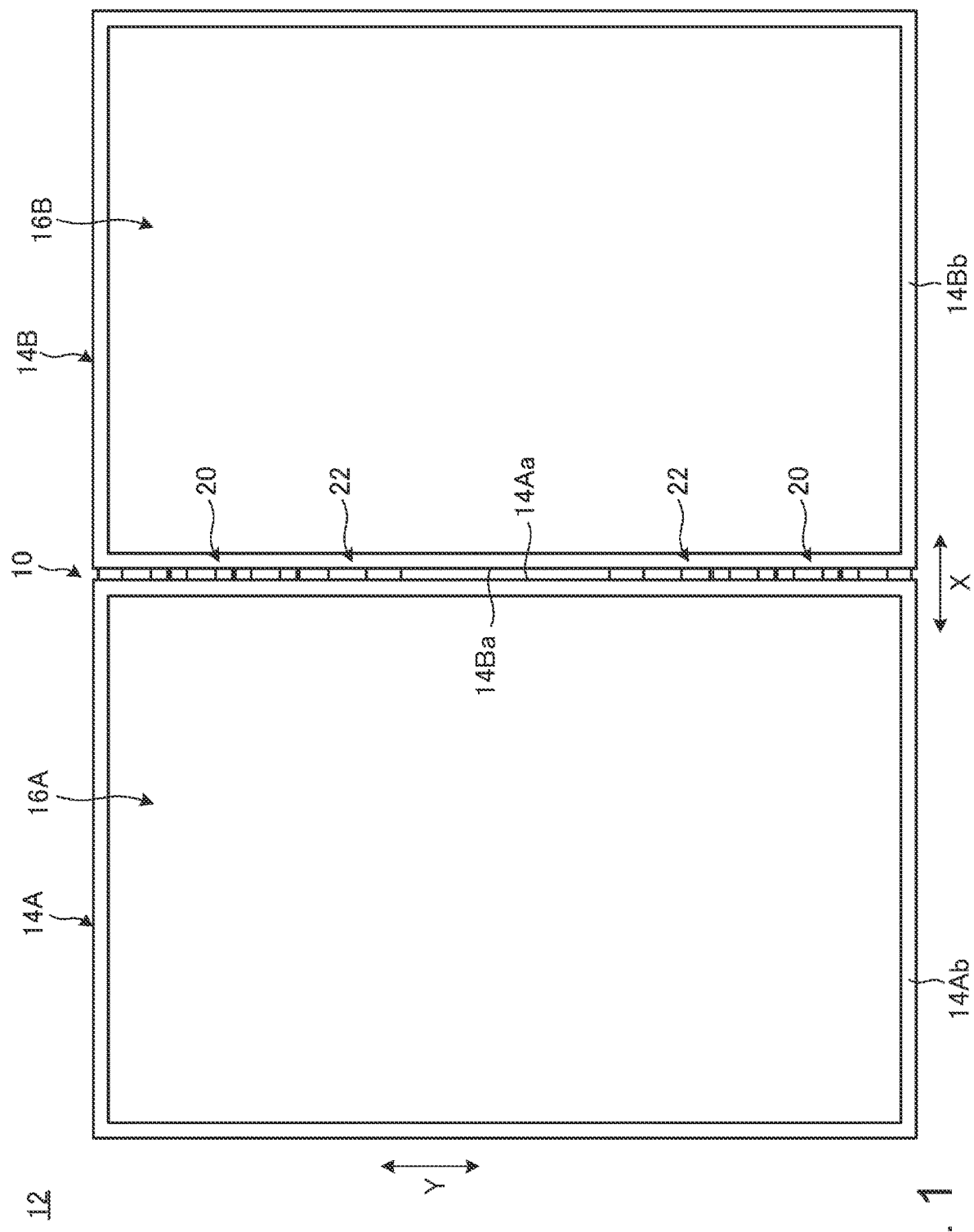
FIG. 1 is a schematic plan view of an electronic apparatus including a hinge device according to an embodiment in a 180° posture.

FIG. 1 is a schematic plan view of an electronic apparatus 12 including a hinge device 10 according to an embodiment in a 180° posture (flat plate form). As illustrated in FIG. 1, the electronic apparatus 12 includes the hinge device 10, a first chassis 14A, a second chassis 14B, a first display 16A, and a second display 16B.

The overall structure of the electronic apparatus 12 will be described first. The electronic apparatus 12 according to this embodiment is a convertible PC usable as a laptop PC and a tablet PC. The electronic apparatus 12 can be used in each of a laptop mode (see FIG. 6B), a large-screen tablet mode (see FIGS. 1, 5C and 6C), and a tablet mode (see FIGS. 5E and 6E), by changing the angle posture between the chassis 14A and 14B.

The laptop mode is a mode in which the angle posture between the chassis 14A and 14B is, for example, between 90° and 180° postures and the electronic apparatus 12 is used as a laptop PC. The large-screen tablet mode is a mode in which the angle posture between the chassis 14A and 14B is, for example, a 180° posture and the two displays 16A and 16B are used as one display to use the electronic apparatus 12 as a large-screen tablet PC. The tablet mode is a mode in which the angle posture between the chassis 14A and 14B is, for example, a 360° posture and one of the displays 16A and 16B is mainly used to use the electronic apparatus 12 as a tablet PC. The electronic apparatus 12 is not limited to such a convertible PC having three modes, and may be, for example, a tablet PC without the laptop mode or a laptop PC without the tablet mode. The electronic apparatus 12 may be a smartphone, a portable game machine, or the like.

The hinge device 10 is interposed between the adjacent end surfaces 14Aa and 14Ba of the chassis 14A and 14B adjacent to each other, and connects the adjacent end surfaces 14Aa and 14Ba. The hinge device 10 connects the chassis 14A and 14B so as to be rotatable from a 0° posture (first folded form, see FIG. 5A) to a 360° posture (second folded form, see FIG. 5E) via a 180° posture (flat plate form, see FIG. 5C). In the 0° posture, the chassis 14A and 14B are arranged one on top of the other, and the display surfaces of the displays 16A and 16B, i.e. the upper surfaces 14Ab and 14Bb of the chassis 14A and 14B, face each other. In the 180° posture, the chassis 14A and 14B are arranged in a direction perpendicular to a surface normal direction approximately on the same plane, and the displays 16A and 16B are arranged side by side and form one large screen. In the 360° posture, the chassis 14A and 14B are arranged one on top of the other in a direction opposite to the 0° posture, and the lower surfaces 14Ac and 14Bc of the chassis 14A and 14B face each other.

Hereafter, in the electronic apparatus 12, the direction in which the chassis 14A and 14B are arranged is referred to as "X direction", the direction along the adjacent end surfaces 14Aa and 14Ba of the chassis 14A and 14B is referred to as "Y direction", and the thickness direction of the chassis 14A and 14B is referred to as "Z direction", as illustrated in FIG. 1, etc.

The chassis 14A and 14B are thin rectangular casings. The chassis 14A and 14B are each formed in a box shape using, for example, a metal plate of stainless steel, magnesium, aluminum, or the like, or a fiber-reinforced resin plate containing any of various resin materials, carbon fiber, or the like. Various electronic components such as a motherboard containing a central processing unit (CPU) and the like, a battery device, an antenna, and a cooling device are mounted in the chassis 14A and 14B.

The displays 16A and 16B are, for example, touch-panel liquid crystal displays or organic EL (electroluminescence) displays. The displays 16A and 16B have their display surfaces located on the upper surfaces 14Ab and 14Bb of the chassis 14A and 14B, respectively. For example, in the laptop mode, one display 16A can display a software keyboard to be used as a keyboard device.

Figure 5A:
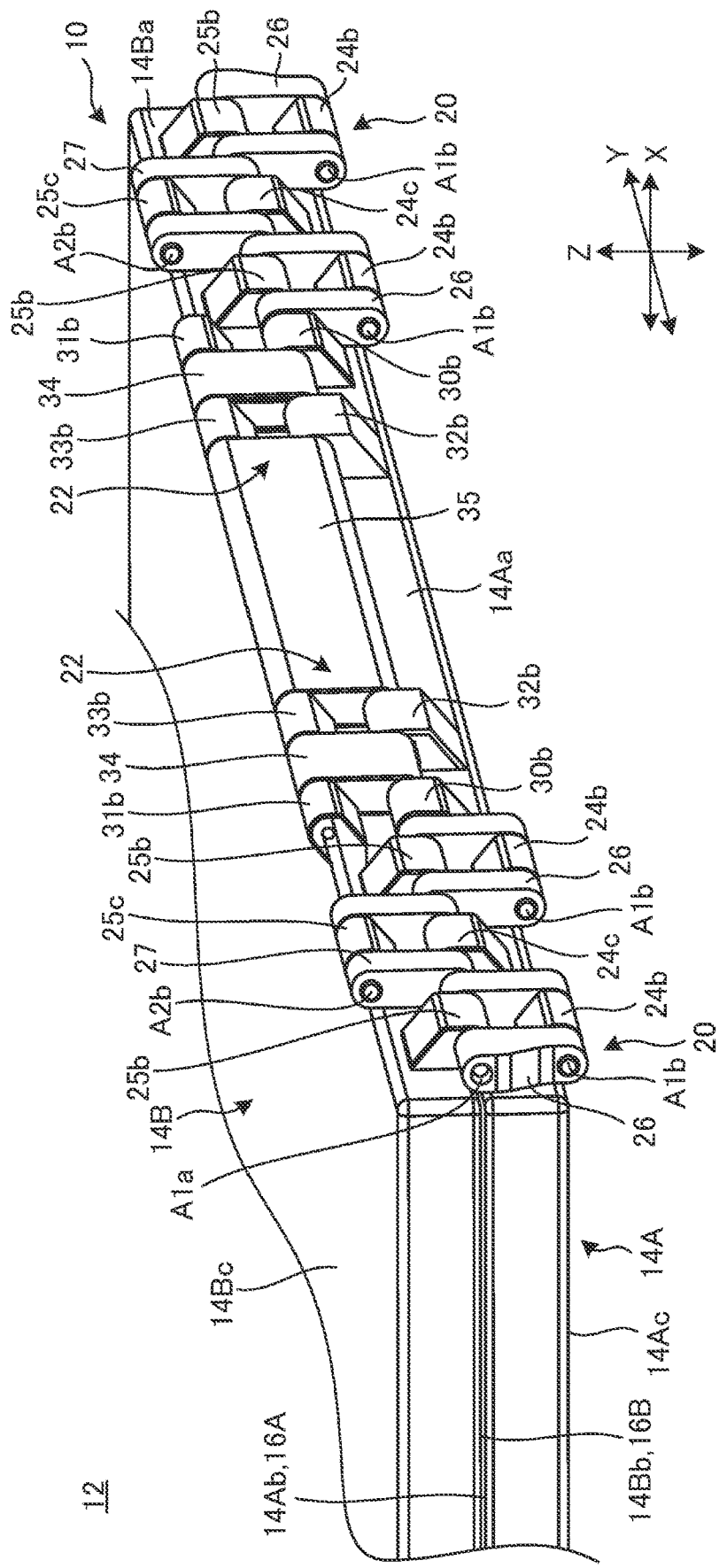
FIG. 5A is an enlarged schematic perspective view of the hinge device and its surroundings in a 0° posture.
Figure 5B:
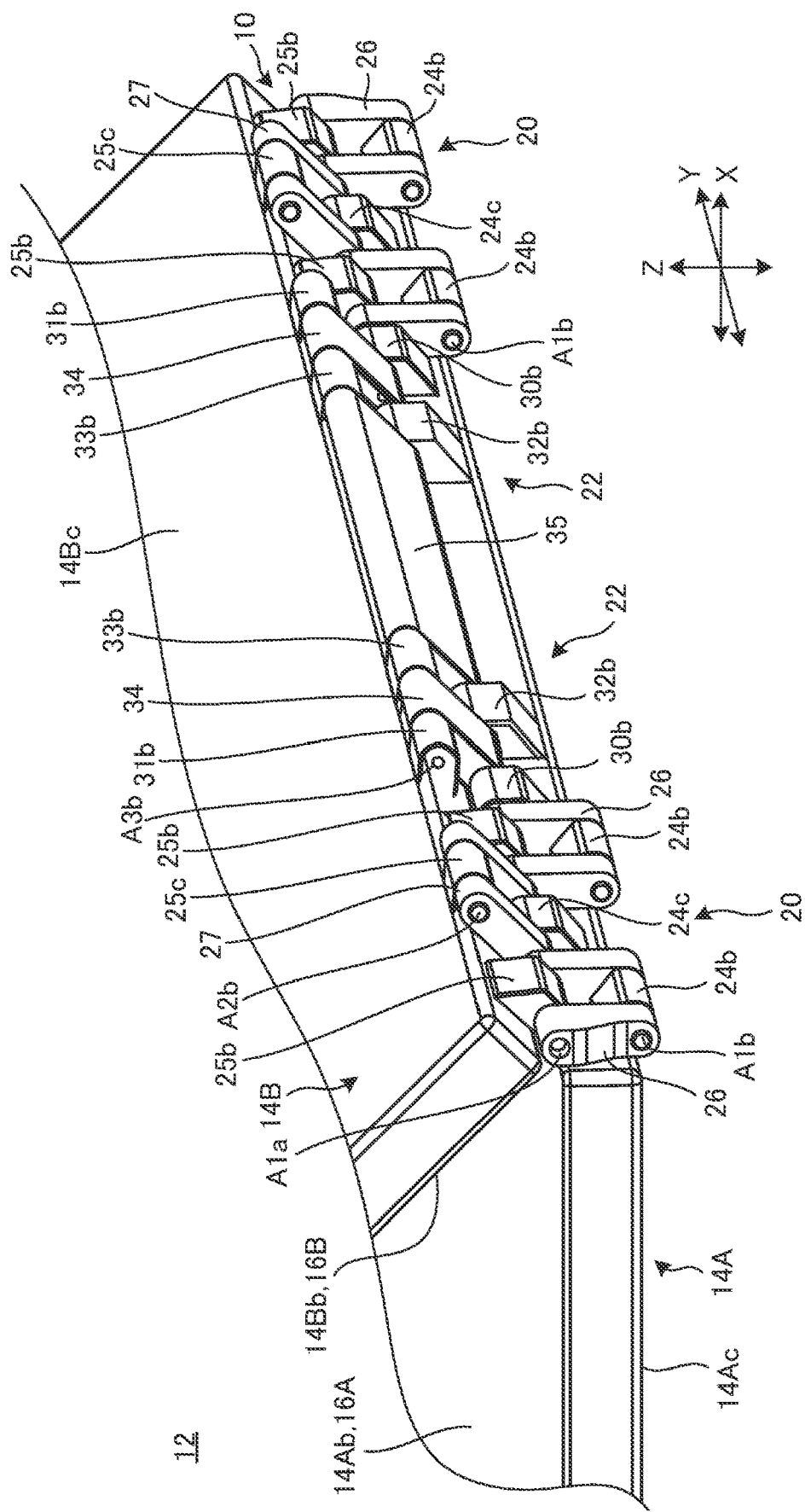
FIG. 5B is a perspective view in a 45° posture.
Figure 5C:
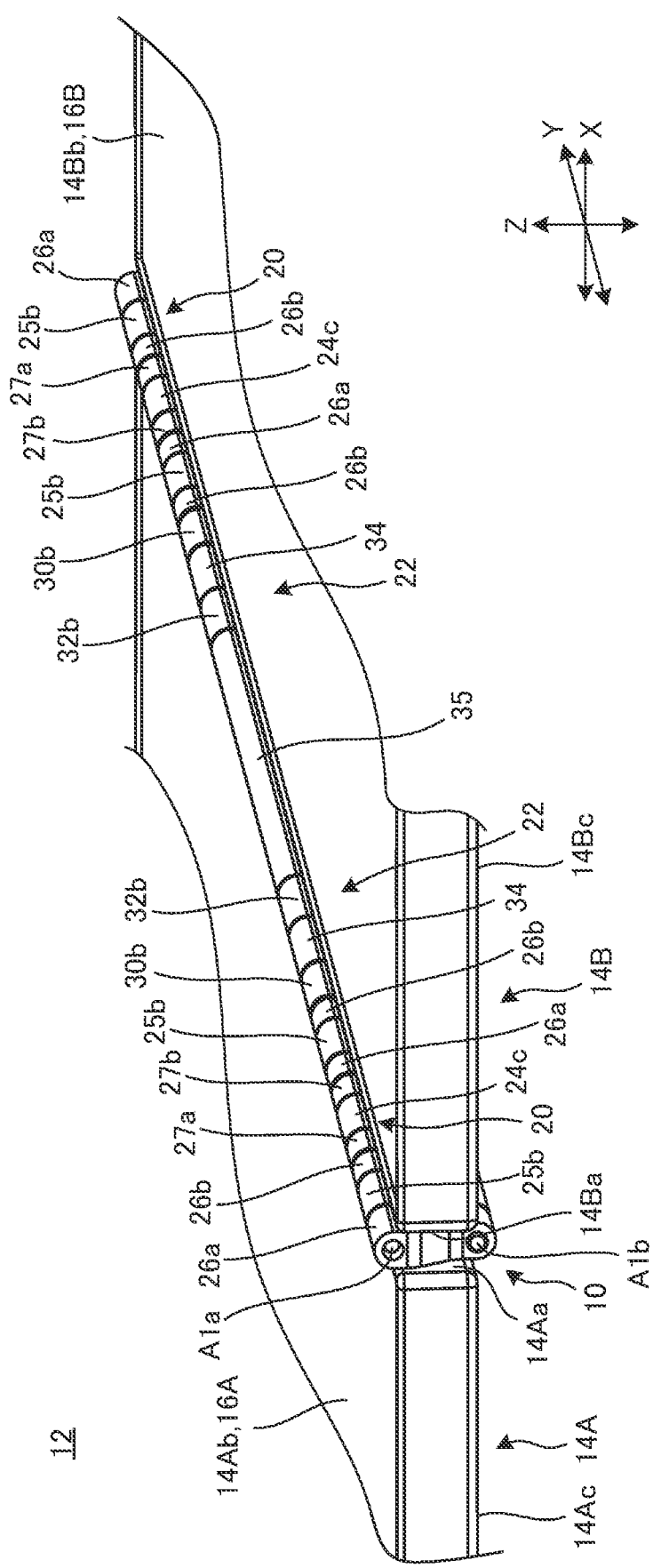
FIG. 5C is a perspective view in a 180° posture.
Figure 5D:
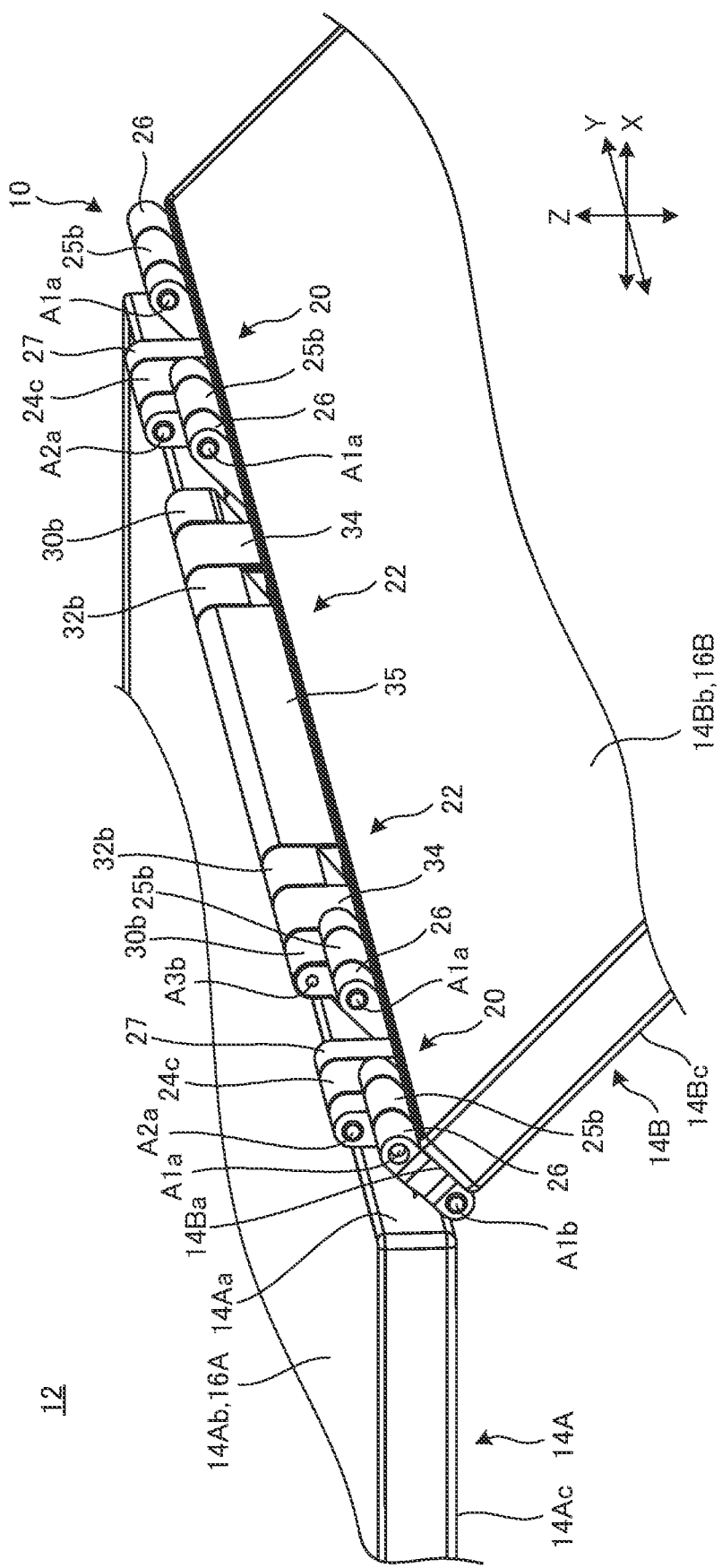
FIG. 5D is a perspective view in a 225° posture.
Figure 5E:
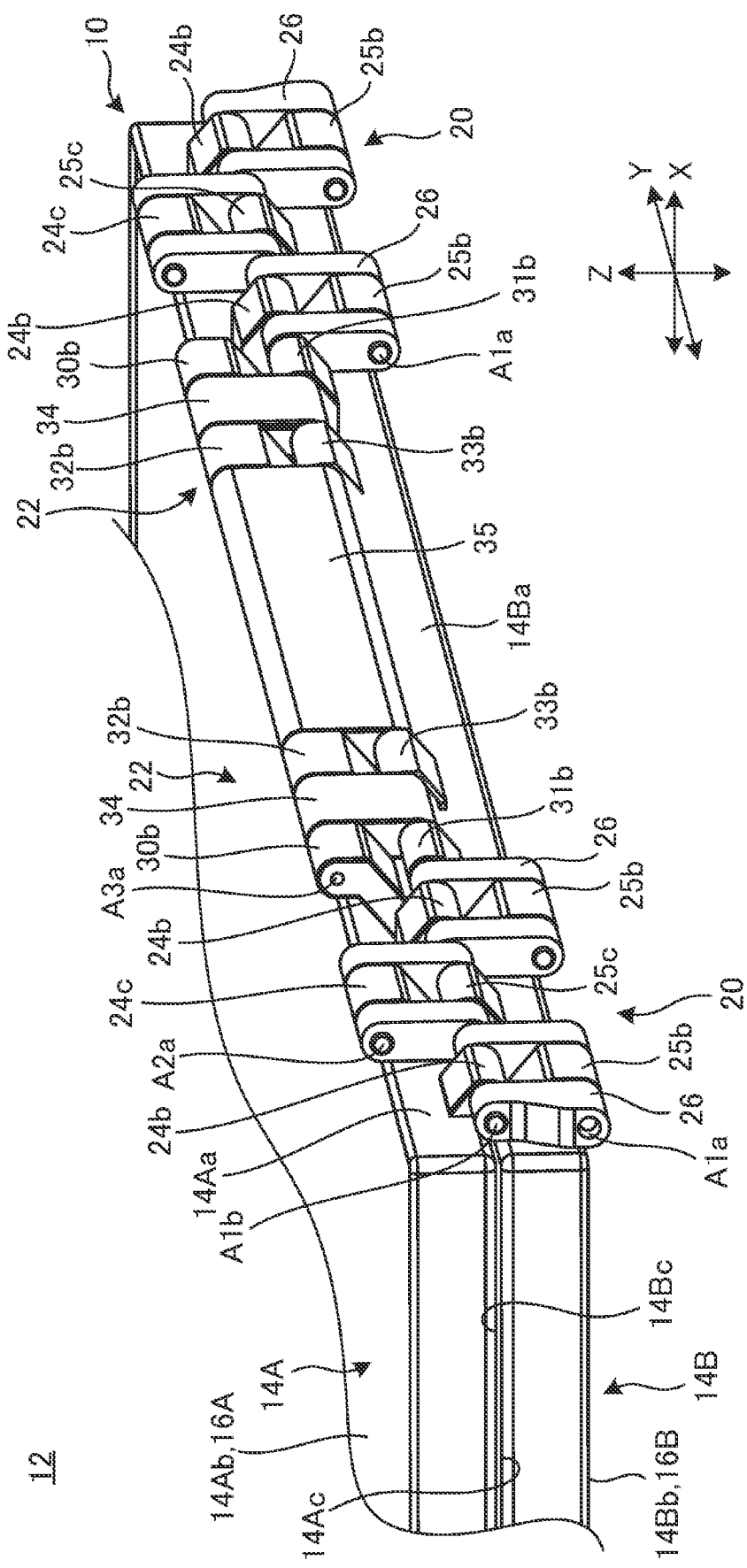
FIG. 5E is a perspective view in a 360° posture.

The adjacent end surfaces 14Aa and 14Ba of the chassis 14A and 14B in this embodiment form a vertical plane along the Z direction (see FIG. 5A, etc.). The adjacent end surfaces 14Aa and 14Ba are adjacent to each other with the hinge device 10 smaller in width being interposed therebetween in the X direction in the 180° posture. Thus, when the electronic apparatus 12 is in the 180° posture, the displays 16A and 16B of the chassis 14A and 14B shaped like a single plate are continuous with almost no gap therebetween, thus forming one large screen (see FIG. 1).

Figure 2B:
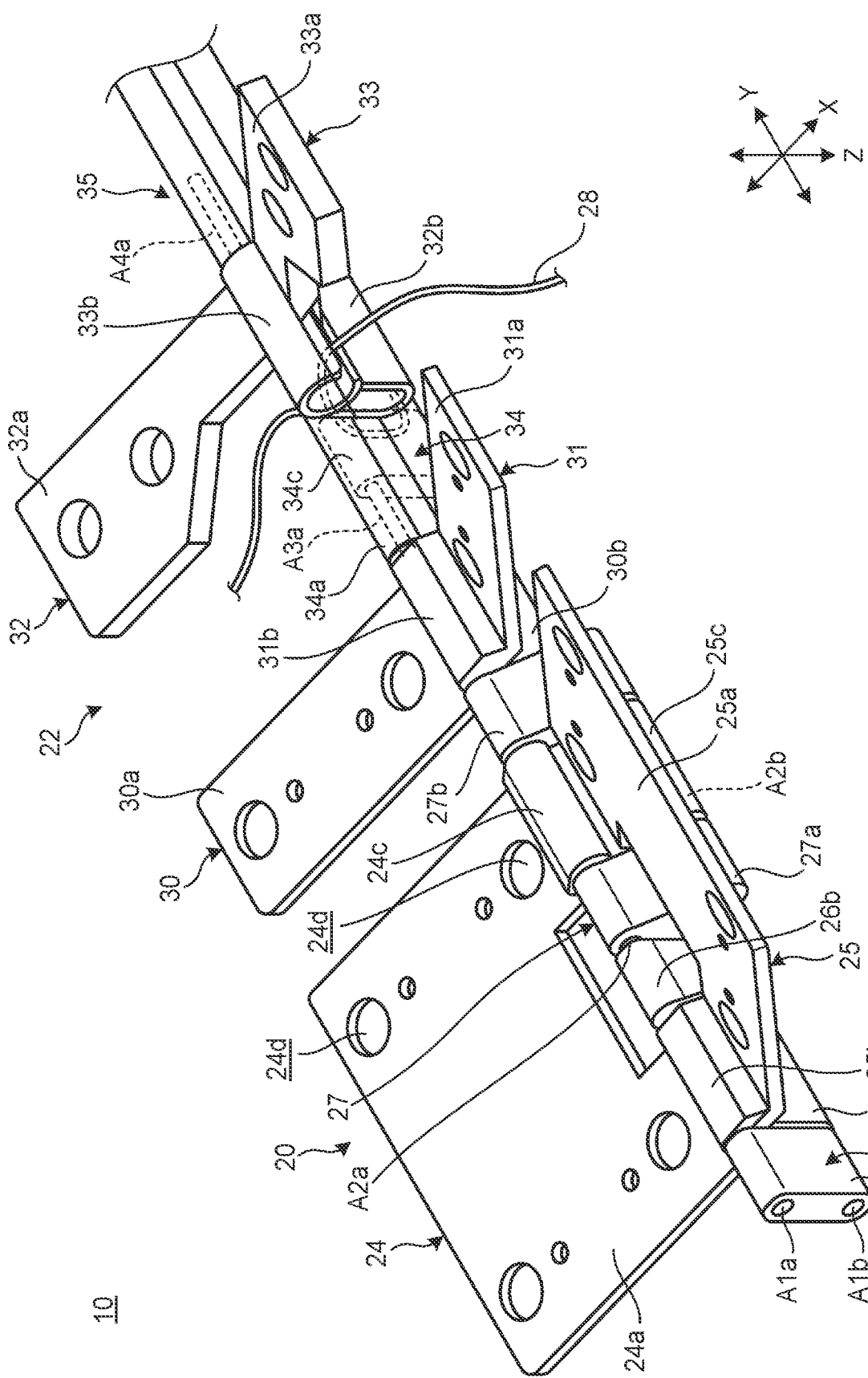
FIG. 2B is a main part enlarged perspective view illustrating the state of the hinge device in a 135° posture.
Figure 2C:
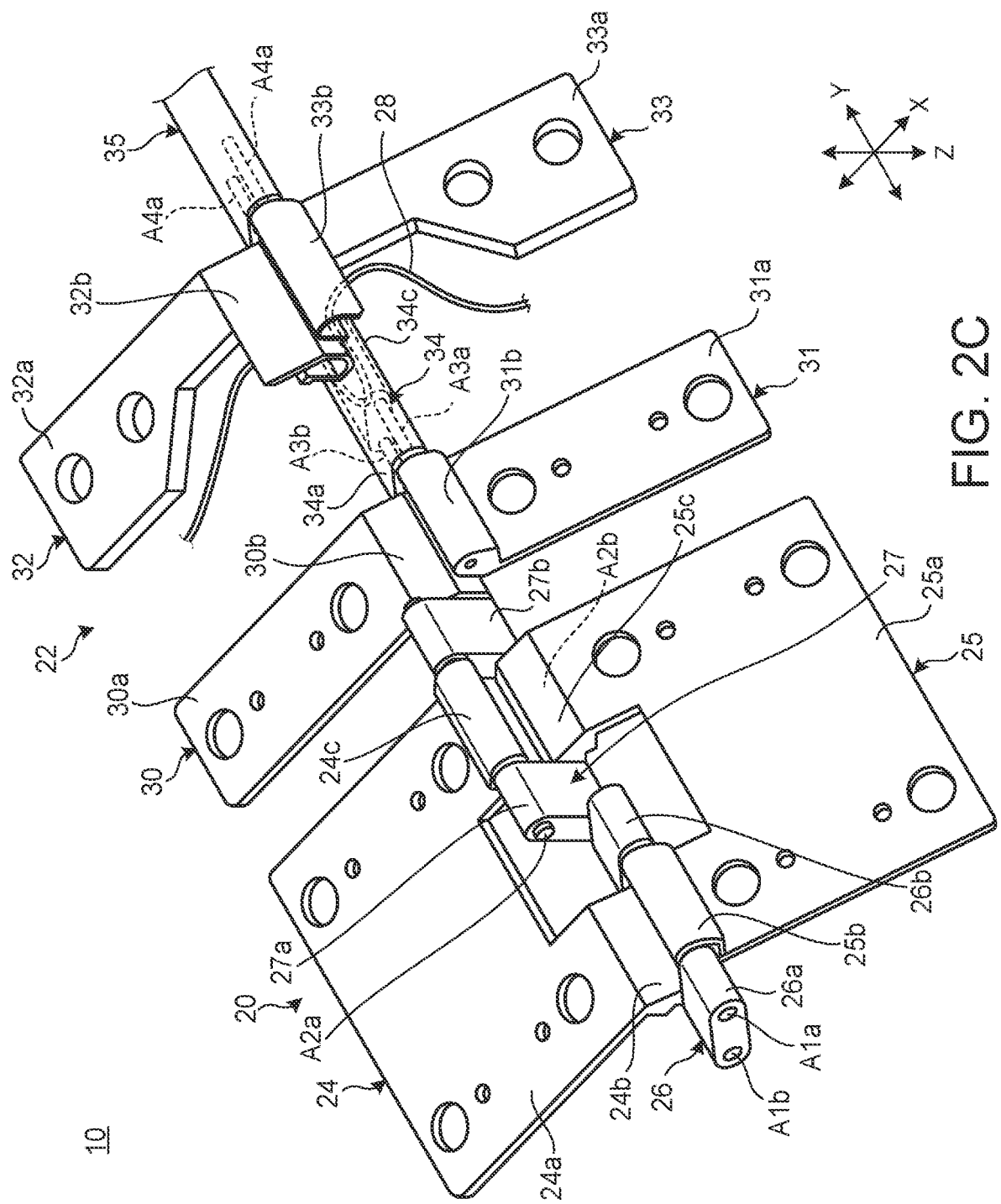
FIG. 2C is a main part enlarged perspective view illustrating the state of the hinge device in a 225° posture.

An example of the structure of the hinge device 10 will be described below. FIGS. 2A, 2B, and 2C are main part enlarged perspective views illustrating the state of the hinge device 10 in the 180° posture, a 135° posture, and a 225° posture, respectively. FIGS. 2A to 2C illustrate an example of the fundamental structure of the hinge device 10. When the hinge device 10 is mounted in the electronic apparatus 12, a plurality of units having the structure illustrated in FIG. 2A may be used with partial changes, as illustrated in FIG. 5A as an example.

As illustrated in FIGS. 2A to 2C, the hinge device 10 includes a hinge main body 20 and a cable passage portion 22. The structures, positional relationships, etc. of the elements of the hinge device 10 will be described below, based on the state in the 180° posture illustrated in FIG. 2A.

The structure of the hinge main body 20 will be described first. The hinge main body 20 rotatably connects the chassis 14A and 14B with a predetermined rotation torque, and is a base part of the hinge device 10. The hinge main body 20 includes a first bracket 24 and a second bracket 25 arranged in the X direction and a first hinge block 26 and a second hinge block 27 arranged in the Y direction.

The first hinge block 26 includes a pair of blocks 26a and 26b arranged in the Y direction with predetermined spacing, and supports a first upper hinge shaft A1a and a first lower hinge shaft A1b between the blocks 26a and 26b. The blocks 26a and 26b are each a plate made of metal or resin and having semicircular upper and lower ends. In the 180° posture illustrated in FIG. 2A, the blocks 26a and 26b have their surfaces along the YZ plane, and are narrow in the X direction. The width between the blocks 26a and 26b is the spacing in which arms 24b and 25b of the brackets 24 and 25 can be placed.

The hinge shafts A1a and A1b are metal shafts. Both ends of each of the hinge shafts A1a and A1b are inserted through the shaft holes formed in the blocks 26a and 26b so as to be not rotatable. The hinge shafts A1a and A1b are parallel to each other. In the 180° posture illustrated in FIG. 2A, the hinge shafts A1a and A1b are vertically arranged, and their shaft center are located in the same YZ plane. In the hinge device 10 according to this embodiment in the 180° posture, the shaft center of the first upper hinge shaft A1a coincides with the upper surfaces 14Ab and 14Bb of the chassis 14A and 14B, and the shaft center of the first lower hinge shaft A1b coincides with the lower surfaces 14Ac and 14Bc (see FIG. 6C).

The second hinge block 27 may have the same structure or approximately the same structure as the first hinge block 26, and accordingly its detailed description is omitted. That is, the second hinge block 27 includes blocks 27a and 27b similar to the blocks 26a and 26b, a second upper hinge shaft A2a similar to the first upper hinge shaft A1a, and a second lower hinge shaft A2b similar to the first lower hinge shaft A1b (also see FIG. 5A). In the 180° posture illustrated in FIG. 2A, the hinge shafts A2a and A2b are respectively coaxial with the hinge shafts A1a and A1b.

The first bracket 24 is a metal plate approximately concave in a plan view. The first bracket 24 includes a first fixing plate 24a, a first lower arm 24b, and a first upper arm 24c. The first fixing plate 24a is a rectangular metal plate fixed to the first chassis 14A. The first fixing plate 24a has a plurality of fastener holes 24d through which fastening screws for the first chassis 14A are inserted.

The first lower arm 24b and the first upper arm 24c protrude toward the second bracket 25 from the respective Y-direction ends of the second bracket 25 side end surface of the first fixing plate 24a. The arms 24b and 24c are plate pieces narrower in the Y direction than the first fixing plate 24a. The first lower arm 24b protrudes in the X direction while bending obliquely downward from the left end of the first fixing plate 24a in FIG. 2A. The first upper arm 24c protrudes in the X direction while bending obliquely upward from the right end of the first fixing plate 24a in FIG. 2A. The first lower arm 24b and the first upper arm 24c alternately protrude vertically with respect to the XY plane (the first fixing plate 24a).

The arms 24b and 24c each have, at its tip, a tubular part (tip tubular part) formed by rolling a metal plate approximately in a circular shape. The tip tubular part of the first lower arm 24b is located between the blocks 26a and 26b.

In the tip tubular part of the first lower arm 24b, the first lower hinge shaft A1b is press-fitted in a state of being relatively rotatable with a predetermined rotation torque. Thus, the first lower arm 24b is connected rotatably relative to the first hinge block 26. The tip tubular part of the first upper arm 24c is located between the blocks 27a and 27b. In the tip tubular part of the first upper arm 24c, the second upper hinge shaft A2a is press-fitted in a state of being relatively rotatable with a predetermined rotation torque. Thus, the first upper arm 24c is connected rotatably relative to the second hinge block 27.

The second bracket 25 may have the same structure or approximately the same structure as the first bracket 24 except that it is configured such that the first bracket 24 is rotated 180° about a virtual hinge shaft along the Y direction at a midpoint between the upper and lower hinge shafts A1a and A1b, and accordingly its detailed description is omitted. That is, the second bracket 25 includes a second fixing plate 25a similar to the first fixing plate 24a, a second upper arm 25b similar to the first lower arm 24b, a second lower arm 25c similar to the first upper arm 24c, and fastener holes 25d similar to the fastener holes 24d.

Also in the second bracket 25, the second upper arm 25b and the second lower arm 25c alternately protrude vertically with respect to the XY plane (the second fixing plate 25a). The tip tubular part of the second upper arm 25b is located between the blocks 26a and 26b. In the tip tubular part of the second upper arm 25b, the first upper hinge shaft A1a is press-fitted in a state of being relatively rotatable with a predetermined rotation torque. Thus, the second upper arm 25b is connected rotatably relative to the first hinge block 26. The tip tubular part of the second lower arm 25c is located between the blocks 27a and 27b. In the tip tubular part of the second lower arm 25c, the second lower hinge shaft A2b is press-fitted in a state of being relatively rotatable with a predetermined rotation torque. Thus, the second lower arm 25c is connected rotatably relative to the second hinge block 27.

Instead of the structure in which the rotation torque is generated by the sliding resistance between the arms 24b, 24c, 25b, and 25c and the hinge shafts A1b, A2a, A1a, and A2b, the hinge device 10 may have a structure in which the rotation torque is generated by the sliding resistance between the blocks 26 and 27 and the hinge shafts A1, A1b, A2a, and A2b. In such a structure, the arms 24b, 24c, 25b, and 25c are non-rotatably connected to the hinge shafts A1b, A2a, A1a, and A2b. The hinge shafts A1a and A1b are each press-fitted in the block 26 in a state in which the hinge shafts A1a and A1b are relatively rotatable with a predetermined rotation torque. The hinge shafts A2a and A2b are each press-fitted in the block 27 in a state in which the hinge shafts A2a and A2b are relatively rotatable with a predetermined rotation torque. Here, for example, a structure may be used in which the blocks 26 and 27 are each formed by a sheet metal member including a metal plate and a pair of tubular parts (tip tubular parts) obtained by rolling both ends thereof approximately in a circular shape. And the hinge shaft A1a, etc. are press-fitted in the corresponding tip tubular parts of the blocks 26 and 27 so as to be relatively rotatable with a predetermined rotation torque.

For example, when rotating the second bracket 25 (the second chassis 14B) of the hinge main body 20 from the 180° posture illustrated in FIG. 2A toward the 0° posture, the first upper hinge shaft A1a and the second upper hinge shaft A2a serve as the rotation axes as illustrated in FIG. 2B. Thus, the second upper arm 25b of the second bracket 25 rotates about the first upper hinge shaft A1a. Meanwhile, the second lower arm 25c draws the second hinge block 27 via the second lower hinge shaft A2b on which the second lower arm 25c is pivotally supported, so that the second hinge block 27 rotates about the second upper hinge shaft A2a. Thus, the second lower arm 25c of the second bracket 25 rotates about (turns around) the second upper hinge shaft A2a. Consequently, the second bracket 25 rotates about the upper hinge shafts A1a and A2a.

For example, when rotating the second bracket 25 (the second chassis 14B) of the hinge main body 20 from the 180° posture illustrated in FIG. 2A toward the 360° posture, the first lower hinge shaft A1b and the second lower hinge shaft A2b serve as the rotation axes as illustrated in FIG. 2C. Thus, the second lower arm 25c of the second bracket 25 rotates about the second lower hinge shaft A2b. Meanwhile, the second upper arm 25b draws the first hinge block 26 via the first upper hinge shaft A1a on which the second upper arm 25b is pivotally supported, so that the first hinge block 26 rotates about the first lower hinge shaft A1b. Thus, the second upper arm 25b of the second bracket 25 rotates about (turns around) the first lower hinge shaft A1b. Consequently, the second bracket 25 rotates about the lower hinge shafts A1b and A2b.

Hence, in the hinge device 10, the upper hinge shafts A1a and A2a are the rotation center between 0° and 180°, and the lower hinge shafts A1b and A2b are the rotation center between 180° and 360°.

The structure of the cable passage portion 22 will be described next. As illustrated in FIGS. 2A to 2C, the cable passage portion 22 is a part that is provided so as to be side by side with the hinge main body 20 (the second hinge block 27) in the Y direction and through which a cable 28 connecting the chassis 14A and 14B is passed. The cable passage portion 22 includes a third bracket 30 and a fourth bracket 31 arranged in the X direction, a fifth bracket 32 and a sixth bracket 33 arranged in the X direction, and a third hinge block 34 and a fourth hinge block 35 arranged in the Y direction. In a structure in which the cable 28 is unnecessary, the cable passage portion 22 may be omitted.

The third hinge block 34 is a plate made of metal or resin and having the same outer shape of a cross section taken along the YZ plane as the block 26a, etc. The brackets 30 and 31 are interposed between the third hinge block 34 and the second hinge block 27. The third hinge block 34 includes a shaft support portion 34a and a cable holding portion 34c having a first cable passage hole 34b. In FIG. 2A, approximately the left half of the third hinge block 34 is the shaft support portion 34a, and approximately the right half of the third hinge block 34 is the cable holding portion 34c.

The shaft support portion 34a supports a third upper hinge shaft A3a and a third lower hinge shaft A3b. The hinge shafts A3a and A3b are metal shafts. In FIG. 2A, the right end of each of the hinge shafts A3a and A3b is cantilever supported non-rotatably by the shaft support portion 34a. The hinge shafts A3a and A3b protrude to the left from the left end surface of the third hinge block 34 in FIG. 2A. In the 180° posture illustrated in FIG. 2A, the hinge shafts A3a and A3b are respectively coaxial with the hinge shafts A1a and A1b (A2a and A2b).

Figure 3A:
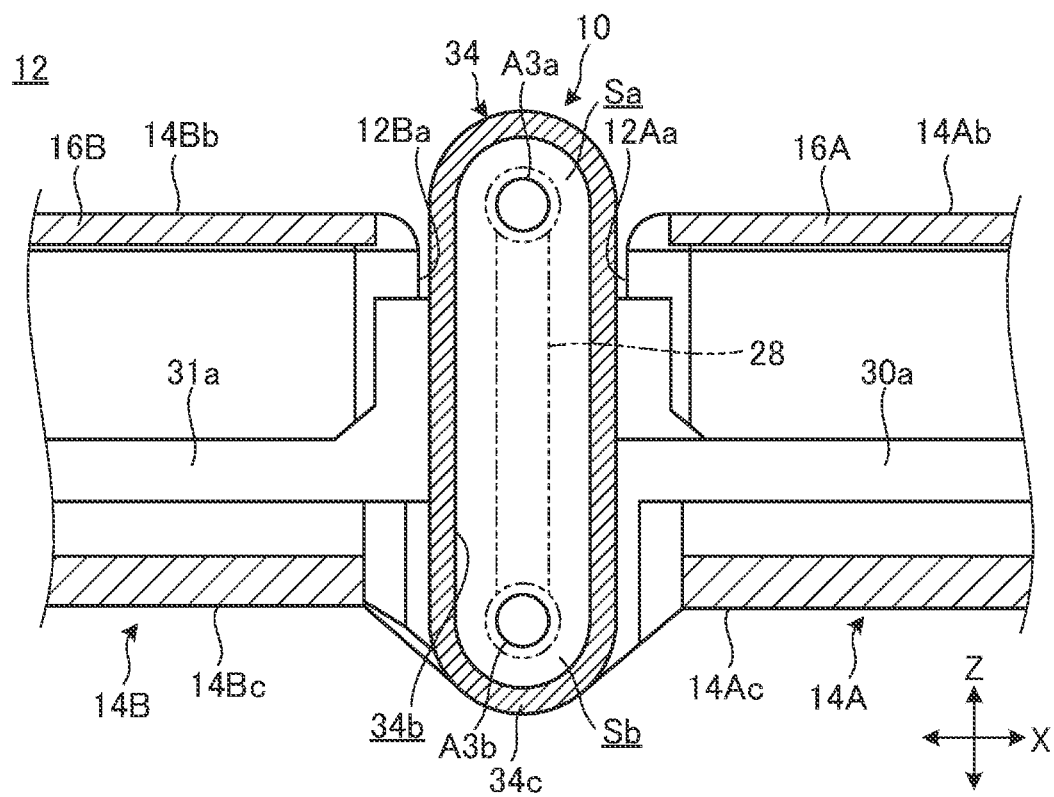
FIG. 3A is a schematic sectional view of the electronic apparatus taken along a plane passing through a cable holding portion.

FIG. 3A is a schematic sectional view of the electronic apparatus 12 taken along the YZ plane passing through the cable holding portion 34c. As illustrated in FIGS. 2A and 3A, the cable holding portion 34c has the first cable passage hole 34b which is hollow. The first cable passage hole 34b is an open hole that communicates between an upper space Sa and a lower space Sb and is open on the right end surface of the third hinge block 34. The upper space Sa coincides with the axis of the third upper hinge shaft A3a. The lower space Sb coincides with the axis of the third lower hinge shaft A3b.

As illustrated in FIGS. 2A to 2C, the fourth hinge block 35 is a plate made of metal or resin and having the same outer shape of a cross section taken along the YZ plane as the block 26a, etc. The brackets 32 and 33 are interposed between the fourth hinge block 35 and the third hinge block 34. In this embodiment, the fourth hinge block 35 is a long block extending in the Y direction (see FIG. 5A).

The fourth hinge block 35 supports a fourth upper hinge shaft A4a and a fourth lower hinge shaft A4b. The hinge shafts A4a and A4b are metal shafts. In FIG. 2A, the right end of each of the hinge shafts A4a and A4b is cantilever supported non-rotatably by the fourth hinge block 35. The hinge shafts A4a and A4b protrude to the left from the left end surface of the fourth hinge block 35 in FIG. 2A. In the 180° posture illustrated in FIG. 2A, the hinge shafts A4a and A4b are respectively coaxial with the hinge shafts A1a and A1b (A2a and A2b) (A3a and A3b).

The third bracket 30 is a metal plate approximately rectangular in a plan view. The third bracket 30 includes a third fixing plate 30a and a third lower arm 30b. The third fixing plate 30a is a rectangular metal plate fixed to the first chassis 14A. The third fixing plate 30a has a plurality of fastener holes 30c through which fastening screws for the first chassis 14A are inserted.

The third lower arm 30b protrudes toward the fourth bracket 31 from the fourth bracket 31 side end of the third fixing plate 30a. The third lower arm 30b protrudes in the X direction while bending obliquely downward from the third fixing plate 30a in FIG. 2A. The third lower arm 30b has, at its tip, a tubular part (tip tubular part) formed by rolling a metal plate approximately in a circular shape. The tip tubular part of the third lower arm 30b is located between the hinge blocks 27 and 34. In the tip tubular part of the third lower arm 30b, the third lower hinge shaft A3b is press-fitted in a state of being relatively rotatable with a predetermined rotation torque. Thus, the third lower arm 30b is connected rotatably relative to the third hinge block 34.

The fourth bracket 31 may have the same structure or approximately the same structure as the third bracket 30 except that it is configured such that the third bracket 30 is rotated 180° about a virtual hinge shaft along the Y direction at a midpoint between the upper and lower hinge shafts A3a and A3b, and accordingly its detailed description is omitted. That is, the fourth bracket 31 includes a fourth fixing plate 31a similar to the third fixing plate 30a, a fourth upper arm 31b similar to the third lower arm 30b, and fastener holes 31c similar to the fastener holes 30c. The tip tubular part of the fourth upper arm 31b is located between the hinge blocks 27 and 34. In the tip tubular part of the fourth upper arm 31b, the third upper hinge shaft A3a is press-fitted in a state of being relatively rotatable with a predetermined rotation torque. Thus, the fourth upper arm 31b is connected rotatably relative to the third hinge block 34.

The fifth bracket 32 is shaped such that one side surface of a metal plate approximately rectangular in a plan view is notched. The fifth bracket 32 includes a fifth fixing plate 32a and a fifth lower arm 32b. The fifth fixing plate 32a is a metal plate fixed to the first chassis 14A. The fifth fixing plate 32a is approximately flagpole-shaped, and is narrower on the fifth lower arm 32b side. The fifth fixing plate 32a has a plurality of fastener holes 32c through which fastening screws for the first chassis 14A are inserted.

The fifth lower arm 32b protrudes toward the sixth bracket 33 from the sixth bracket 33 side end of the fifth fixing plate 32a. The fifth lower arm 32b protrudes in the X direction while bending obliquely downward from the fifth fixing plate 32a in FIG. 2A. The fifth lower arm 32b has, at its tip, a tubular part (tip tubular part) formed by rolling a metal plate approximately in a circular shape. The tip tubular part of the fifth lower arm 32b is located between the hinge blocks 34 and 35. In the right half of the tip tubular part of the fifth lower arm 32b in FIG. 2A, the fourth lower hinge shaft A4b is press-fitted in a state of being relatively rotatable with a predetermined rotation torque. Thus, the fifth lower arm 32b is connected rotatably relative to the fourth hinge block 35.

Figure 3B:
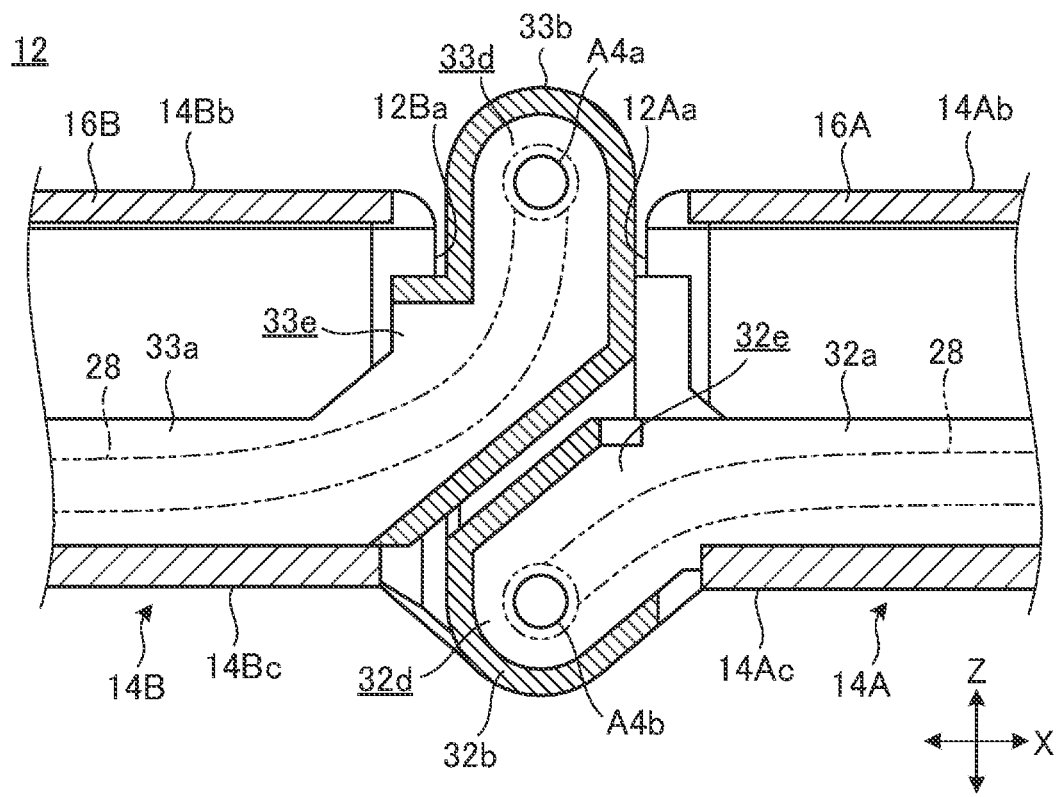
FIG. 3B is a schematic sectional view of the electronic apparatus taken along a plane passing through a fifth lower arm.
Figure 4:
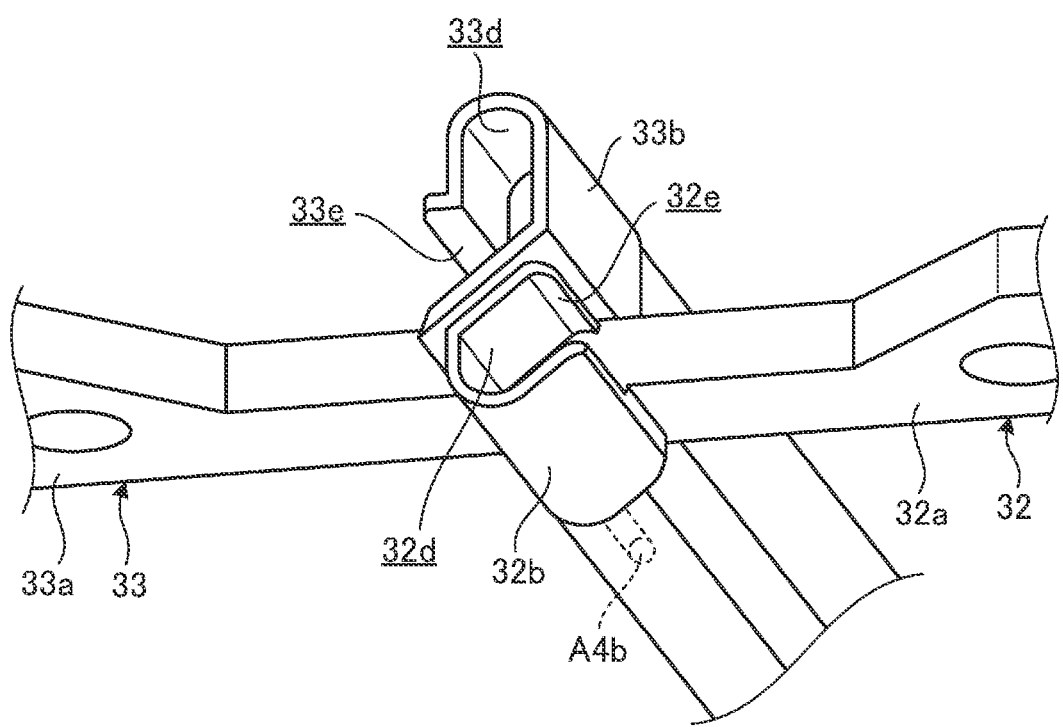
FIG. 4 is a main part enlarged perspective view of third and fourth brackets.

FIG. 3B is a schematic sectional view of the electronic apparatus 12 taken along the YZ plane passing through the fifth lower arm 32b. FIG. 4 is a main part enlarged perspective view of the brackets 32 and 33. As illustrated in FIGS. 2A, 3B, and 4, the tip tubular part of the fifth lower arm 32b has a second cable passage hole 32d which is hollow. The second cable passage hole 32d is provided in the left half of the tip tubular part in FIG. 2A. The second cable passage hole 32d is a space in which the fourth lower hinge shaft A4b is not located in the tip tubular part of the fifth lower arm 32b. The second cable passage hole 32d is open to the third hinge block 34 side. The second cable passage hole 32d also has an opening 32e that is open to the first chassis 12A side (the fifth fixing plate 32a side) in the 180° posture illustrated in FIG. 2A (see FIGS. 3B and 4). Thus, the second cable passage hole 32d is open to the first chassis 14A and the lower space Sb of the first cable passage hole 34b.

The sixth bracket 33 may have the same structure or approximately the same structure as the fifth bracket 32 except that it is configured such that the fifth bracket 32 is rotated 180° about a virtual hinge shaft along the Y direction at a midpoint between the upper and lower hinge shafts A4a and A4b, and accordingly its detailed description is omitted. That is, the sixth bracket 33 includes a sixth fixing plate 33a similar to the fifth fixing plate 32a, a sixth upper arm 33b similar to the fifth lower arm 32b, fastener holes 33c similar to the fastener holes 32c, a third cable passage hole 33d similar to the second cable passage hole 32d, and an opening 33e similar to the opening 32e. The tip tubular part of the sixth upper arm 33b is located between the hinge blocks 27 and 34. In the right half of the tip tubular part of the sixth upper arm 33b in FIG. 2A, the fourth upper hinge shaft A4a is press-fitted in a state of being relatively rotatable with a predetermined rotation torque. Thus, the sixth upper arm 33b is connected rotatably relative to the fourth hinge block 35. The third cable passage hole 33d is provided in the left half of the tip tubular part of the sixth upper arm 33b in FIG. 2B. The third cable passage hole 33d is open to the second chassis 14B and the upper space Sa of the first cable passage hole 34b.

The state of the cable 28 in the cable passage portion 22 will be described below. The cable 28 is inserted into the second cable passage hole 32d from the first chassis 14A via the opening 32e, and then extends to the lower space Sb of the first cable passage hole 34b. The cable 28 further extends from the lower space Sb to the upper space Sa, inserted into the third cable passage hole 33d from the upper space Sa, and then passes through the opening 33e to the second chassis 14B.

In the cable passage portion 22, both of the brackets 30 and 32 fixed to the first chassis 14A are connected to the lower hinge shafts (the third lower hinge shaft A3b and the fourth lower hinge shaft A4b). Moreover, both of the brackets 31 and 33 fixed to the second chassis 14B are connected to the upper hinge shafts (the third upper hinge shaft A3a and the fourth upper hinge shaft A4a).

For example, when rotating the brackets 31 and 33 (the second chassis 14B) of the cable passage portion 22 from the 180° posture illustrated in FIG. 2A toward the 0° posture, the upper hinge shafts A3a and A4a serve as the rotation axes as illustrated in FIG. 2B. Thus, the brackets 31 and 33 rotate about the upper hinge shafts A3a and A4a via the upper arms 31b and 33b.

For example, when rotating the brackets 31 and 33 (the second chassis 14B) of the cable passage portion 22 from the 180° posture illustrated in FIG. 2A toward the 360° posture, the lower hinge shafts A3b and A4b serve as the rotation axes as illustrated in FIG. 2C. Thus, the upper arms 31b and 33b of the brackets 31 and 33 draw the hinge blocks 34 and 35 via the upper hinge shafts A3a and A4a on which the upper arms 31b and 33b are pivotally supported, so that the hinge blocks 34 and 35 rotate about the lower hinge shafts A3b and A4b. Thus, the upper arms 31b and 33b of the brackets 31 and 33 rotate about (turn around) the lower hinge shafts A3b and A4b. Consequently, the brackets 31 and 33 rotate about the lower hinge shafts A3b and A4b.

In this way, in the cable passage portion 22, the hinge blocks 34 and 35, the vertically arranged arms 31b and 30b, and the vertically arranged arms 33b and 32b always rotate in the same direction. That is, the third hinge block 34 and the arms 33b and 32b having the cable passage holes 32d, 34b, and 33d through which the cable 28 is passed always rotate integrally in the same direction. Therefore, in rotation operation, the cable 28 is prevented from being subjected to a force in a reverse direction between the third hinge block 34 and the brackets 32 and 33 and as a result damaged or broken. The rotation direction of the hinge blocks 34 and 35 between 0° and 180° and between 180° and 360° may be set to an opposite direction to that in the structure illustrated in FIGS. 2A to 2B. In the case where the same structure as the cable passage holes 34b, 32d, and 33d can be formed in the hinge main body 20, the cable passage portion 22 may be integrally formed in the hinge main body 20.

The rotation operation between the chassis 14A and 14B will be described below. FIGS. 5A to 5E are each an enlarged schematic perspective view of the hinge device 10 and its surroundings at a corresponding angle of the rotation operation between the chassis 14A and 14B. FIGS. 6A to 6E are each an enlarged schematic side view of the hinge device 10 and its surroundings at a corresponding angle of the rotation operation between the chassis 14A and 14B.

The hinge device 10 of the structural example illustrated in FIGS. 5A to 5E has two sets of hinge main bodies 20 and cable passage portions 22 in the Y direction, where the two sets are plane-symmetrical with respect to the XZ plane. The cable passage portions 22 in the respective sets share the fourth hinge block 35. The hinge main body 20 in each set adds one more arm 24b, one more arm 25b, and one more first hinge block 26 to the structure illustrated in FIGS. 2A to 2C. The additional arms 24b and 25b and first hinge block 26 are located between the second hinge block 27 and the cable passage portion 22. As a result of adding one more set of arms 24b and 25b and hinge shafts A1a and A1b, the hinge device 10 of the structural example illustrated in FIGS. 5A to 5E can further enhance the stability of rotation operation and generate a higher rotation torque.

The cable passage portion 22 in the structural example illustrated in FIGS. 5A to 5E has the third bracket 30 and the fourth bracket 31 inverted vertically in the overlapping part, with respect to the cable passage portion 22 in the structural example illustrated in FIGS. 2A to 2C. Likewise, the fifth bracket 32 and the sixth bracket 33 are inverted vertically in the overlapping part. Hence, in the cable passage portion 22 in the structural example illustrated in FIGS. 5A to 5E, the third lower arm 30b of the third bracket 30 is connected to the third upper hinge shaft A3a, and the fourth upper arm 31b of the fourth bracket 31 is connected to the third lower hinge shaft A3b. That is, the third lower arm 30b functions substantially as a third upper arm, and the fourth upper arm 31b functions substantially as a fourth lower arm. Likewise, the fifth lower arm 32b of the fifth bracket 32 is connected to the fourth upper hinge shaft A4a, and the sixth upper arm 33b of the sixth bracket 33 is connected to the fourth lower hinge shaft A4b. That is, the fifth lower arm 32b functions substantially as a fifth upper arm, and the sixth upper arm 33b functions substantially as a sixth lower arm.

The positional relationships, the installation numbers, etc. of the elements in the hinge main body 20 and the cable passage portion 22 may be other than those in the structural example illustrated in FIGS. 2A to 2C and the structural example illustrated in FIGS. 5A to 5E, and may be changed as appropriate.

Figure 6A:
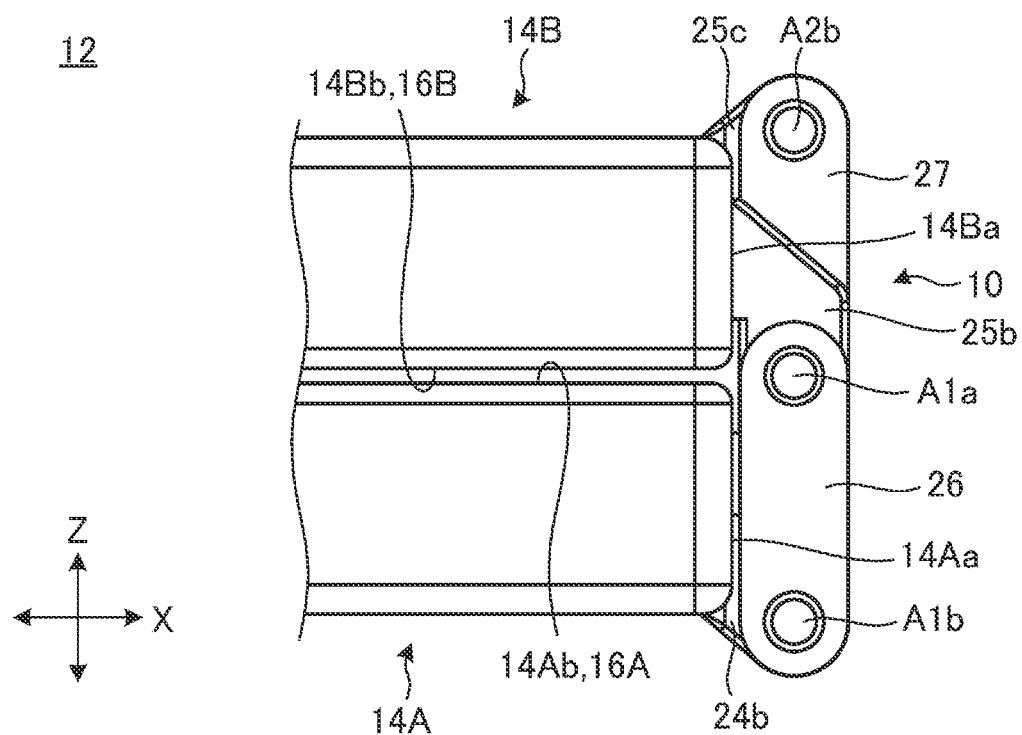
FIG. 6A is an enlarged schematic side view of the hinge device and its surroundings in a 0° posture.
Figure 6B:
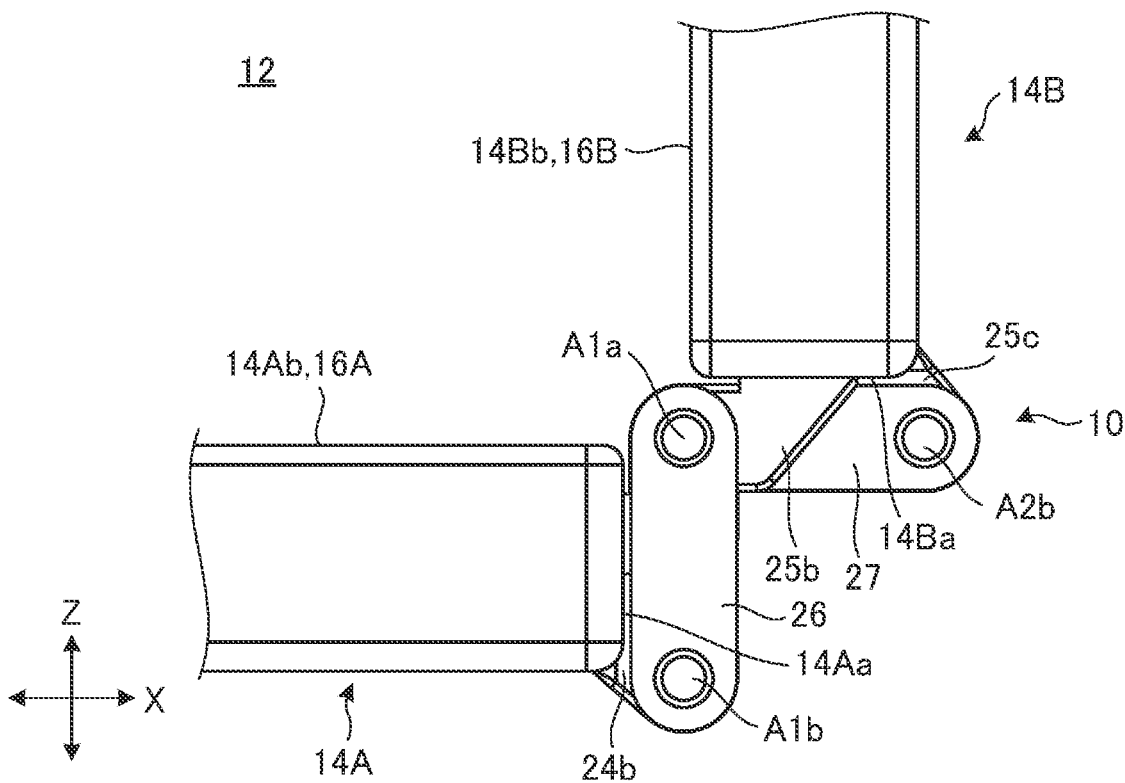
FIG. 6B is a side view in a 90° posture.
Figure 6C:
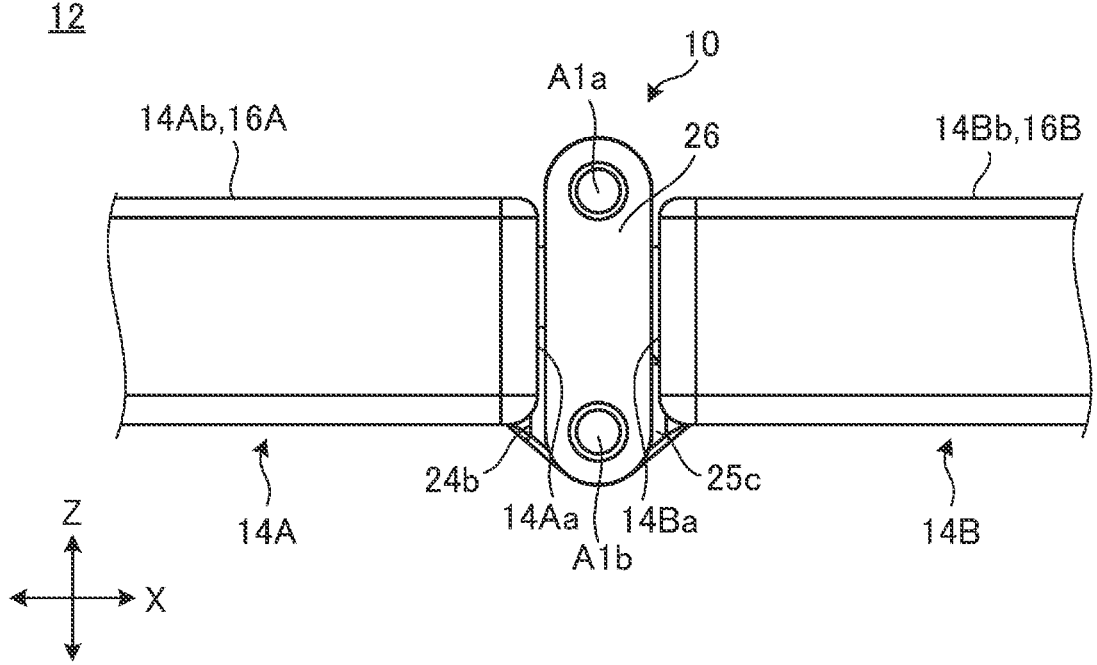
FIG. 6C is a side view in a 180° posture.
Figure 6D:
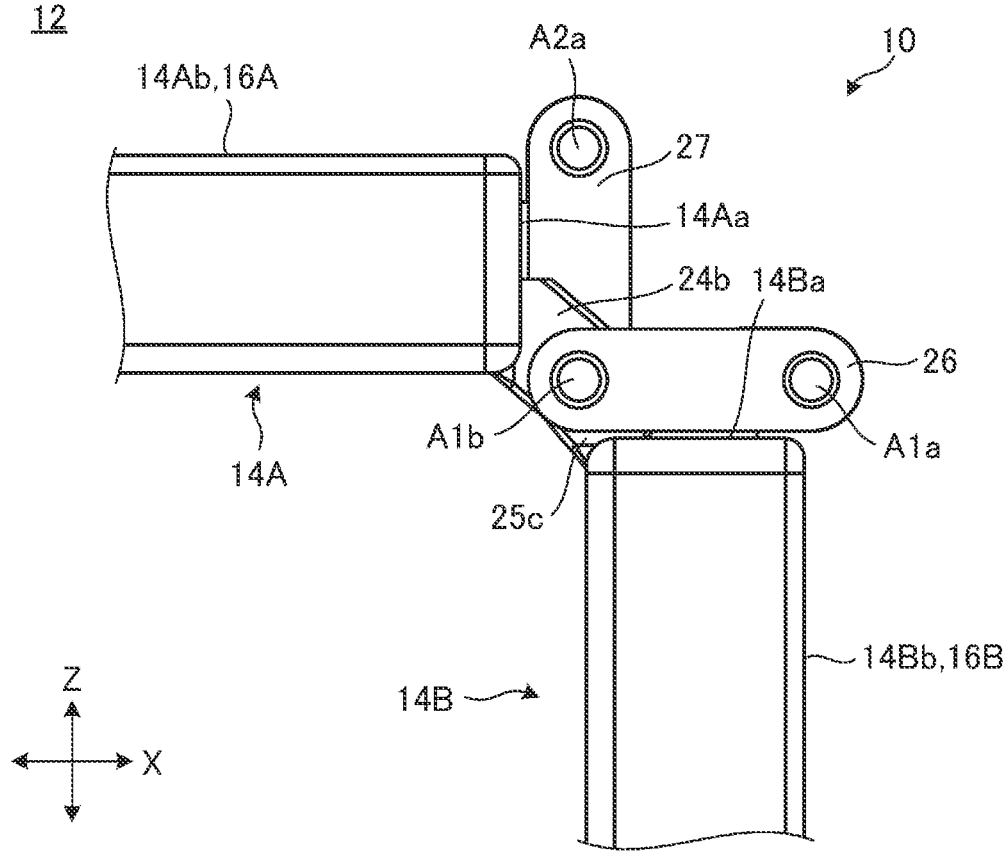
FIG. 6D is a side view in a 270° posture.
Figure 6E:
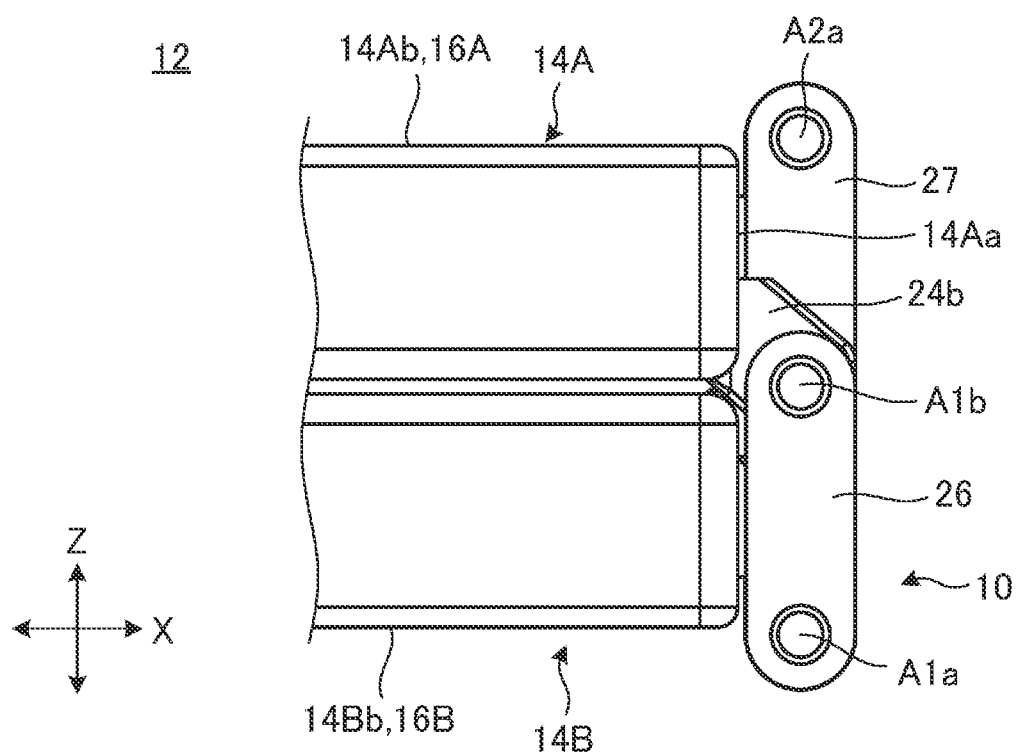
FIG. 6E is a side view in a 360° posture.

First, in the 0° posture illustrated in FIGS. 5A and 6A, the chassis 14A and 14B are in the first folded form in which their upper surfaces 14Ab and 14Bb, i.e. the displays 16A and 16B, face each other. In the 0° posture, the electronic apparatus 12 is compact, and the displays 16A and 16B are protected inside the chassis 14A and 14B. The electronic apparatus 12 is therefore easy to carry and store.

In the 0° posture, in the hinge main body 20, the second lower hinge shaft A2b, the first upper hinge shaft A1a (the second upper hinge shaft A2a), and the first lower hinge shaft A1b are arranged in this order in the downward direction in a side view. The first hinge block 26 faces the adjacent end surface 14Aa of the first chassis 14A. The second hinge block 27 faces the adjacent end surface 14Ba of the second chassis 14B. In the cable passage portion 22, the third lower hinge shaft A3b (the fourth lower hinge shaft A4b) and the third upper hinge shaft A3a (the fourth upper hinge shaft A4a) are arranged in this order in the downward direction in a side view. The hinge blocks 34 and 35 face the adjacent end surface 14Ba of the second chassis 14B.

The rotation operation from the 0° posture to the 180° posture will be described next. In this rotation operation, the upper hinge shafts A1a and A2a (A3a and A4a) are the rotation axes, as illustrated in FIGS. 5A to 5C and 6A to 6C. Consequently, the hinge block 27 (34, 35) rotates synchronously with the rotation operation of the second chassis 14B separating from the upper surface 14Ab of the first chassis 14A. Here, the electronic apparatus 12 is in the laptop mode between the 90° posture (see FIG. 6B) and the 180° posture (see FIGS. 5C and 6C).

In the 180° posture, the electronic apparatus 12 is in the large-screen tablet mode. Here, in the hinge device 10, the upper hinge shaft and the lower hinge shaft are vertically arranged between the adjacent end surfaces 12Aa and 12Ba arranged in the X direction (see FIGS. 5C and 6C). Specifically, the first upper hinge shaft A1a and the first lower hinge shaft A1b are vertically arranged, and the second upper hinge shaft A2a and the second lower hinge shaft A2b are vertically arranged. Moreover, the third upper hinge shaft A3a and the third lower hinge shaft A3b are vertically arranged, and the fourth upper hinge shaft A4a and the fourth lower hinge shaft A4b are vertically arranged. Thus, the hinge device 10 has the minimum thickness corresponding to only the width of the hinge blocks 26, 27, 34, and 35 in the X direction. Consequently, the adjacent end surfaces 12Aa and 12Ba of the chassis 14A and 14B are closest to each other. Hence, the left and right displays 16A and 16B have their adjacent edges very close to each other, and appear to form one large screen.

The rotation operation from the 180° posture to the 360° posture will be described next. In this rotation operation, the lower hinge shafts A1b and A2b (A3b and A4b) are the rotation axes, as illustrated in FIGS. 5C to 5E and 6C to 6E. Consequently, the hinge block 26 rotates synchronously with the rotation operation of the lower surface 14Bc of the second chassis 14B approaching the lower surface 14Ac of the first chassis 14A. In the 360° posture, the electronic apparatus 12 is in the tablet mode in which the lower surfaces 14Ac and 14Bc of the chassis 14A and 14B face each other and the displays 16A and 16B are exposed outside.

In the 360° posture, in the hinge main body 20, the second upper hinge shaft A2a, the first lower hinge shaft A1b (the second lower hinge shaft A2b), and the first upper hinge shaft A1a are arranged in this order in the downward direction in a side view. The first hinge block 26 faces the adjacent end surface 14Ba of the second chassis 14B. The second hinge block 27 faces the adjacent end surface 14Aa of the first chassis 14A. In the cable passage portion 22, the third upper hinge shaft A3a (the fourth upper hinge shaft A4a) and the third lower hinge shaft A3b (the fourth lower hinge shaft A4b) are arranged in this order in the downward direction in a side view. The hinge blocks 34 and 35 face the adjacent end surface 14Aa of the first chassis 14A.

The rotation operation from the 360° posture to the 0° posture is reverse operation of the above-described rotation operation from the 0° posture to the 360° posture, and accordingly its detailed description is omitted.

As described above, the electronic apparatus 12 according to this embodiment includes the chassis 14A and 14B adjacent to each other, the displays 16A and 16B provided on the upper surfaces 14Ab and 14Bb of the chassis 14A and 14B, and the hinge device 10. The hinge device 10 according to this embodiment connects the chassis 14A and 14B relatively rotatably from the 0° posture to the 360° posture. The hinge device 10 includes the first hinge block 26 that supports the first upper hinge shaft A1a and the first lower hinge shaft A1b arranged vertically and the second hinge block 27 that supports the second upper hinge shaft A2a, and the second lower hinge shaft A2b arranged vertically, between the adjacent end surfaces 12Aa and 12Ba in the 180° posture. The first bracket 24 fixed to the first chassis 12A includes the first lower arm 24b connected to the first lower hinge shaft A1b, and the first upper arm 24c connected to the second upper hinge shaft A2a. The second bracket 25 fixed to the second chassis 12B includes the second upper arm 25b connected to the first upper hinge shaft A1a, and the second lower arm 25c connected to the second lower hinge shaft A2b.

Accordingly, in the electronic apparatus 12, in the large-screen tablet mode in which the posture between the chassis 14A and 14B is the 180° posture, the X-direction thickness of the hinge device 10 located between the adjacent end surfaces 12Aa and 12Ba of the chassis 14A and 14B is very thin. That is, in the hinge device 10, the hinge shafts A1a and A1b (A2a and A2b) are vertically arranged in the 180° posture. Thus, the hinge device 10 can be reduced in thickness because an increase in thickness by arranging hinge shafts in the X direction in the 180° posture is prevented. The electronic apparatus 12 therefore has the adjacent end surfaces 12Aa and 12Ba of the chassis 14A and 14B close to each other. Consequently, in the 180° posture, the gap between the displays 16A and 16B can be reduced, and the separation part formed at the center between the displays 16A and 16B can be made very narrow.

As illustrated in FIG. 2A, in the hinge device 10, the arms 24b, 24c, 25b, and 25c connected to the vertically arranged hinge shafts A1a and A1b and the vertically arranged hinge shafts A2a and A2b alternate with respect to the hinge shafts in the 180° posture. Specifically, the first bracket 24 fixed to the first chassis 14A has one arm 24b connected to the first lower hinge shaft A1b and the other arm 24c connected to the second upper hinge shaft A2a, thus alternating with each other. The second bracket 25 fixed to the second chassis 14B has one arm 25b connected to the first upper hinge shaft A1a and the other arm 25c connected to the second lower hinge shaft A2b, thus alternating with each other.

Therefore, even in the case where, in the 180° posture illustrated in FIG. 2A, the hinge device 10 is subjected to an external force in a direction in which the chassis 14A and 14B separate from each other in the X direction, the arms 24b, 24c, 25b, and 25c arranged alternately pull each hinge shaft. As a result, the first hinge block 26 and the second hinge block 27 are subjected to forces in the directions of rotating opposite to each other, and thus the rotations are canceled out. Consequently, a narrow arrangement in which the hinge shafts are vertically arranged is maintained without the hinge blocks 26 and 27 being rotated.

The hinge device 10 includes the cable passage portion 22 that is provided side by side with the second hinge block 27 in the axial direction of the hinge shafts A1a and A1b, etc. and through which the cable 28 connecting the chassis 14A and 14B is passed. Hence, in the case where the chassis 14A and 14B are electrically connected by the cable 28, the electronic apparatus 12 can prevent the cable 28 from being exposed to outside while passing the cable 28 between the chassis 14A and 14B. The cable passage portion 22 may be provided side by side with the first hinge block 26.

In the electronic apparatus 12 in the 180° posture, the first upper hinge shaft A1a and the second upper hinge shaft A2a have their shaft centers at a position coinciding with the upper surfaces 14Ab and 14Bb of the chassis 14A and 14B. Thus, interference between the adjacent end surfaces 12Aa and 12Ba when rotating from the 180° posture to the 0° posture can be avoided, with it being possible achieve smooth rotation. Likewise, in the electronic apparatus 12 in the 180° posture, the first lower hinge shaft A1b and the second lower hinge shaft A2b have their shaft centers at a position coinciding with the lower surfaces 14Ac and 14Bc of the chassis 14A and 14B. Thus, interference between the adjacent end surfaces 12Aa and 12Ba when rotating from the 180° posture to the 360° posture can be avoided, with it being possible achieve smooth rotation.

The hinge device 10 according to this embodiment has a structure in which the arms 24b, 24c, 25b, and 25c extend obliquely upward or obliquely downward, so that interference between the adjacent end surfaces 12Aa and 12Ba during rotation can be avoided more reliably. In the case of a structure in which the arms 24b, 24c, 25b, and 25c extend horizontally, for example, the upper hinge shafts A1a and A2a are located higher than the upper surfaces 14Ab and 14Bb and the lower hinge shafts A1b and A2b are located lower than the lower surfaces 14Ac and 14Bc.

Figure 7A:
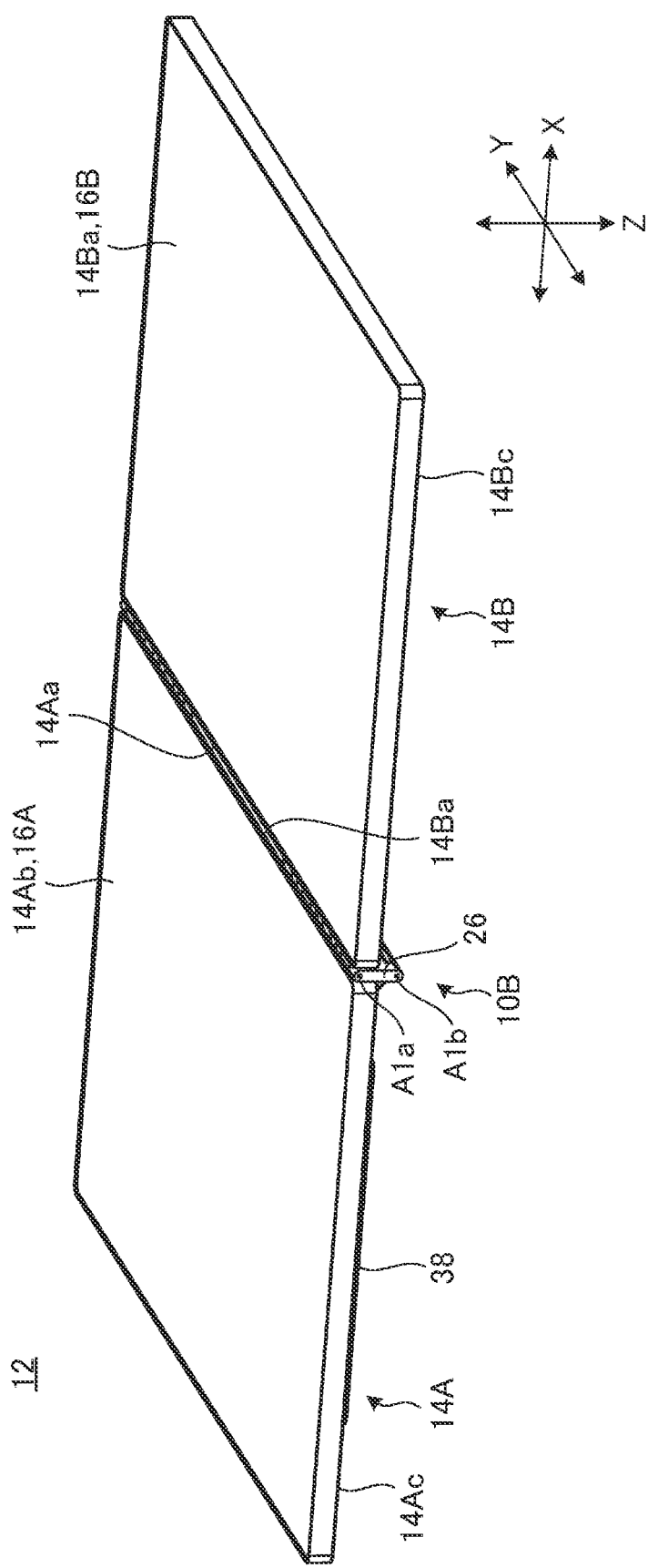
FIG. 7A is a schematic plan view of an electronic apparatus including a hinge device according to a modification in a 180° posture.
Figure 7B:
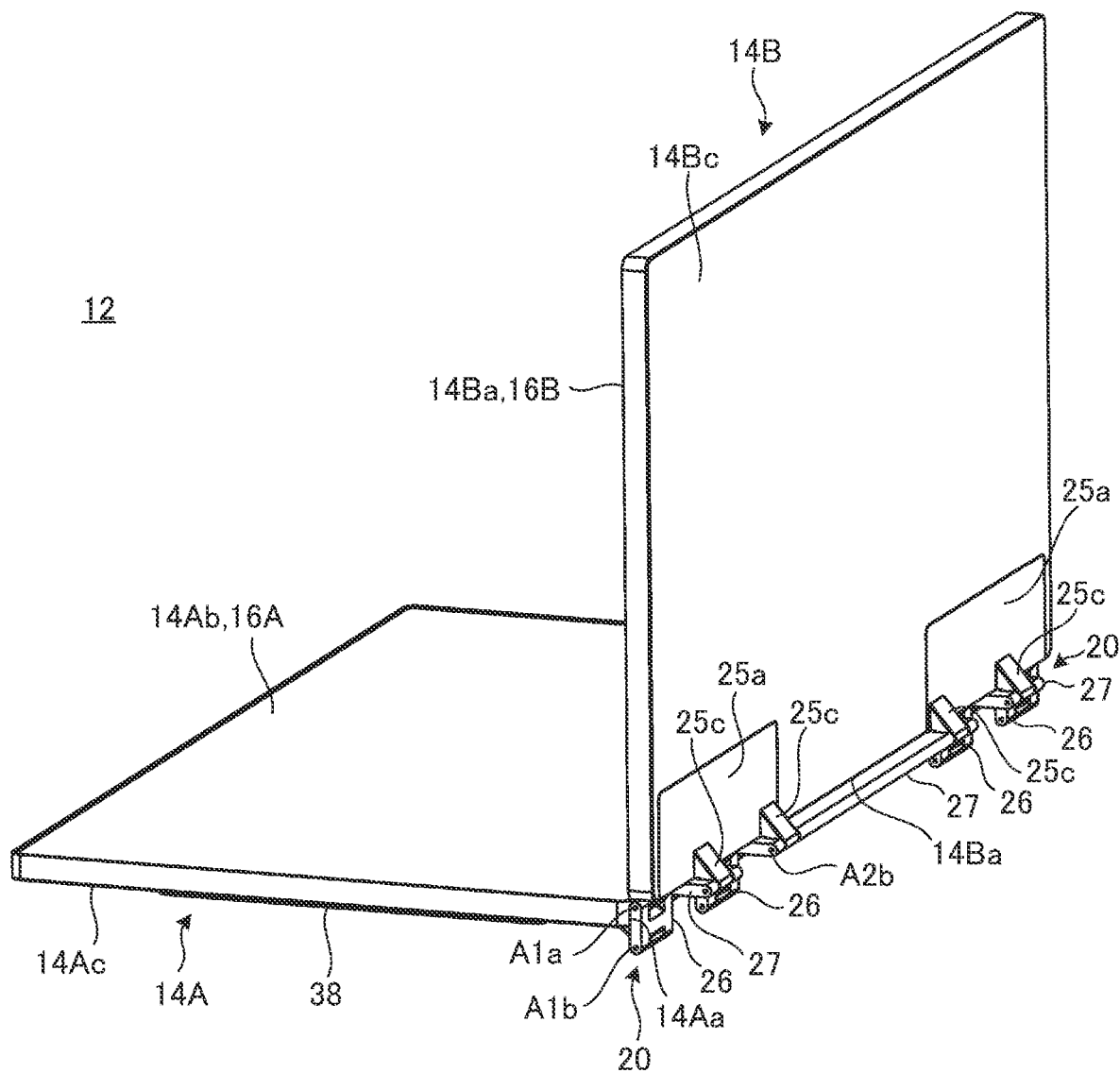
FIG. 7B is a schematic perspective view of the electronic apparatus illustrated in FIG. 7A in a 90° posture.
Figure 7C:
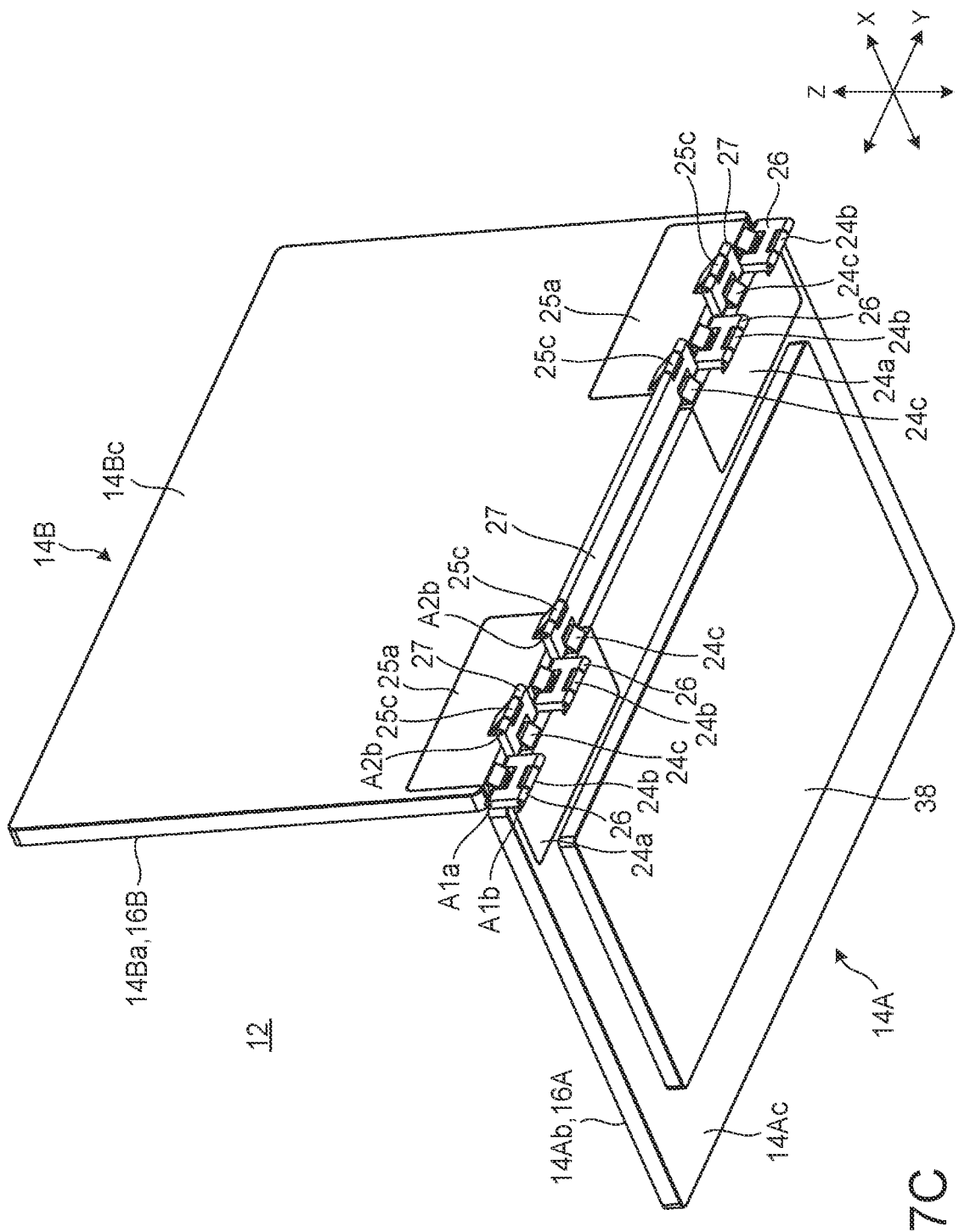
FIG. 7C is a perspective view of the electronic apparatus illustrated in FIG. 7B as seen from another angle.
Figure 8A:
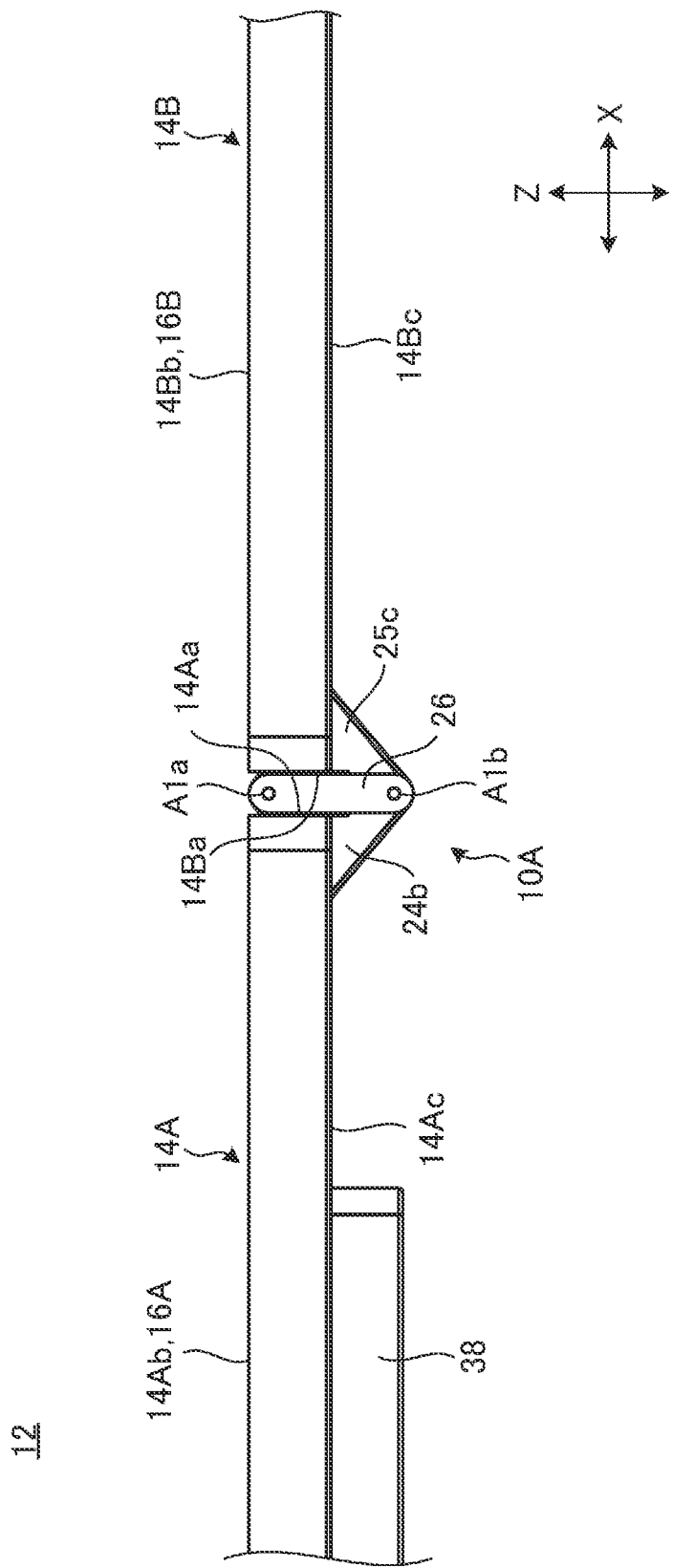
FIG. 8A is an enlarged schematic side view of the hinge device and its surroundings in the electronic apparatus illustrated in FIG. 7A in a 180° posture.
Figure 8B:
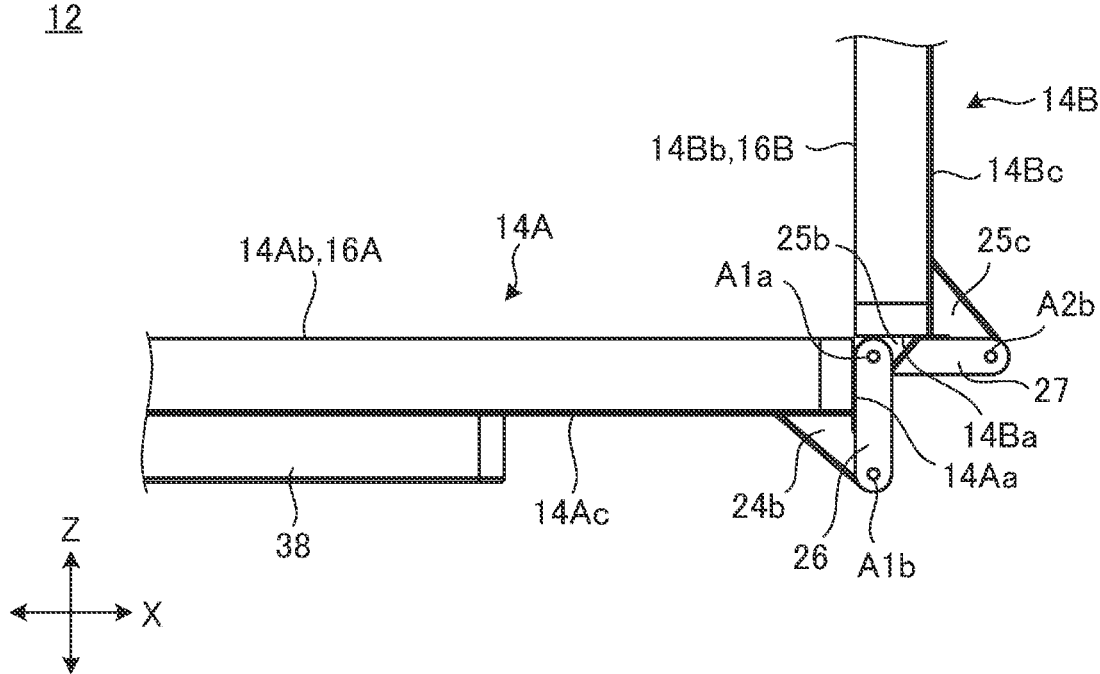
FIG. 8B is a side view in a 90° posture.
Figure 8C:
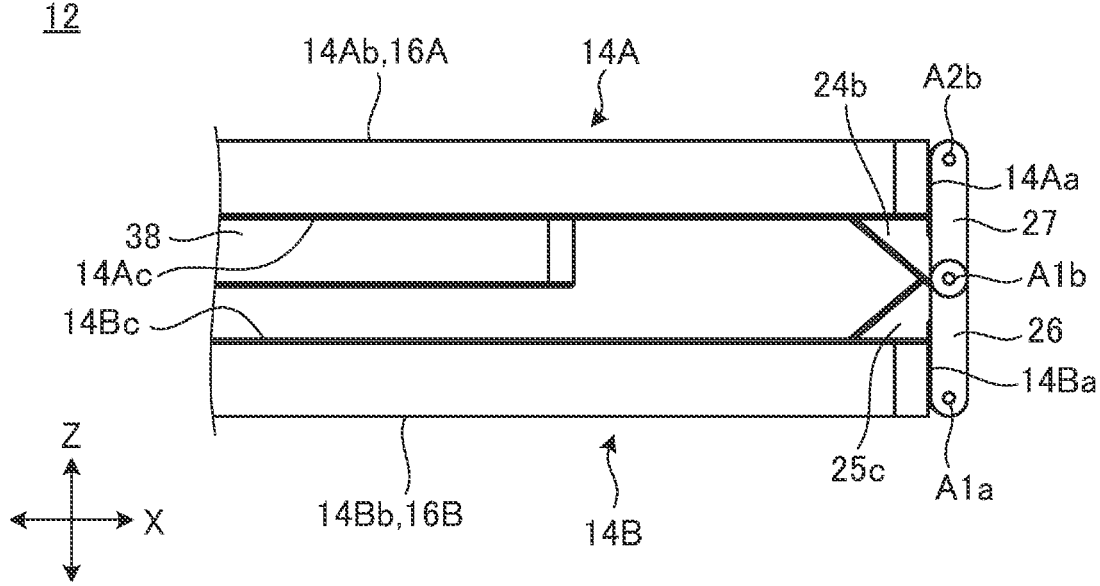
FIG. 8C is a side view in a 360° posture.

A hinge device 10A according to a modification will be described below. FIG. 7A is a schematic plan view of the electronic apparatus 12 including the hinge device 10A according to the modification in the 180° posture. FIGS. 7B and 7C is a schematic perspective view of the electronic apparatus 12 illustrated in FIG. 7A in the 90° posture. FIGS. 8A to 8C are each an enlarged schematic side view of the hinge device 10A and its surroundings at a corresponding angle when rotating the chassis 14A and 14B in the electronic apparatus 12 illustrated in FIG. 7A. In FIGS. 7A to 8C, the same reference signs are as in FIGS. 1 to 6E represent the same or similar structures, and their detailed description is omitted as they have the same or similar functions and effects as in FIGS. 1 to 6E.

The foregoing hinge device 10 has the shaft centers of the upper hinge shafts A1a and A2a coinciding with the upper surfaces 14Ab and 14Bb of the chassis 14A and 14B, to rotate the chassis 14A and 14B in a range of 0° to 360°. Accordingly, in the hinge device 10 in the 180° posture, the hinge blocks 26 and 27 protrude higher than the upper surfaces 14Ab and 14Bb and form rib projections between the upper surfaces 14Ab and 14Bb (see FIGS. 5C and 6C).

In the hinge device 10A illustrated in FIGS. 7A to 8C, on the other hand, the upper end surfaces of the hinge blocks 26 and 27 are flush with or lower than the upper surfaces 14Ab and 14Bb. That is, in the hinge device 10A, the shaft centers of the upper hinge shafts A1a and A2a are located lower than the upper surfaces 14Ab and 14Bb. Such hinge device 10A has improved appearance quality because the elements of the hinge device 10A do not protrude between the displays 16A and 16B in the 180° posture.

In the electronic apparatus 12 including the hinge device 10A, when the chassis 14A and 14B are rotated from 180° to 0°, the adjacent end surfaces 12Aa and 12Ba interfere with each other at 90°, making further rotation impossible (see FIGS. 7B, 7C, and 8B). However, since the chassis 14A and 14B can be rotated to the 360° posture, the portability does not decrease.

As illustrated in FIGS. 7C and 8A, the electronic apparatus 12 includes a bulging portion 38 protruding downward from the lower surface 14Ac of the first chassis 14A. The bulging portion 38 is a part for storing electronic components (for example, a motherboard and a battery device) that cannot be stored in the chassis 14A and 14B reduced in thickness. Accordingly, in the electronic apparatus 12, the shaft centers of the lower hinge shafts A1b and A2b are lowered to a position coinciding the lower surface of the bulging portion 38 (see FIG. 8A), in order to ensure rotation operation from 180° to 360° (see FIG. 8C). The bulging portion 38 may be omitted. The bulging portion 38 may be used in the electronic apparatus 12 illustrated in FIGS. 1 to 6C.

The hinge device 10A illustrated in FIGS. 7A to 8C has, for example, a structure in which the cable passage portion 22 is omitted, and therefore the second hinge block 27 at the center is shared by the left and right hinge main bodies 20. The hinge device 10A may include the cable passage portion 22, as in the foregoing hinge device 10.

When making the chassis 14A and 14B rotatable between 0° to 270°, for example, the lower end surfaces of the hinge blocks 26 and 27 are flush with or higher than the lower surfaces 14Ac and 14Bc, that is, the shaft centers of the lower hinge shafts A1b and A2b are located higher than the lower surfaces 14Ac and 14Bc. In this way, each element of the hinge device is kept from protruding between the lower surfaces 14Ac and 14Bc in the 180° posture.

The present invention is not limited to the foregoing embodiments, and changes can be freely made without departing from the scope of the present invention.

Although the above describes the structure including the pair of chassis 14A and 14B and the pair of displays 16A and 16B as an example, three or more chassis in each of which a display is mounted may be provided. For example, in the case where three chassis are provided, a double door structure in which the respective chassis are connected to both sides of the center chassis using the hinge device 10 may be used.

Although the above describes the electronic apparatus 12 as a portable information device, the electronic apparatus 12 may be a display device without a processor such as a CPU.

DESCRIPTION OF SYMBOLS 10, 10A hinge device
12 electronic apparatus
14A first chassis
14B second chassis
16A first display
16B second display
20 hinge main body
22 cable passage portion
24 first bracket
25 second bracket
26 first hinge block
27 second hinge block
28 cable
30 third bracket
31 fourth bracket
32 fifth bracket
33 sixth bracket
34 third hinge block
35 fourth hinge block
A1a first upper hinge shaft
A1b first lower hinge shaft
A2a second upper hinge shaft
A2b second lower hinge shaft
A3a third upper hinge shaft
A3b third lower hinge shaft
A4a fourth upper hinge shaft
A4b fourth lower hinge shaft

What is claimed is:

1. An electronic apparatus comprising:
   a first chassis;
   a second chassis adjacent to the first chassis;
   a first display provided on an upper surface of the first chassis;
   a second display provided on an upper surface of the second chassis; and
   a hinge device that connects the first chassis and the second chassis so as to be relatively rotatable at least from a folded form in which the first chassis and the second chassis are disposed to overlap in a surface normal direction to a flat plate form in which the first chassis and the second chassis are arranged in a direction perpendicular to the surface normal direction,
   wherein the hinge device comprises:
      a first bracket comprising a first fixing plate fixed to the first chassis;
      a second bracket comprising a second fixing plate fixed to the second chassis;
      a first hinge block that supports a first upper hinge shaft and a first lower hinge shaft arranged vertically between adjacent end surfaces of the first chassis and the second chassis in the flat plate form; and
      a second hinge block that is arranged side by side with the first hinge block in an axial direction of the first upper hinge shaft and the first lower hinge shaft, and supports a second upper hinge shaft and a second lower hinge shaft arranged vertically between the adjacent end surfaces in the flat plate form,
   wherein in the flat plate form, the first upper hinge shaft and the second upper hinge shaft are coaxial,
   wherein in the flat plate form, the first lower hinge shaft and the second lower hinge shaft are coaxial,
   wherein the first bracket further comprises:
      a first lower arm connected to the first lower hinge shaft to be connected rotatably relative to the first hinge block; and
      a first upper arm connected to the second upper hinge shaft to be connected rotatably relative to the second hinge block,
   wherein the second bracket further comprises:
      a second upper arm connected to the first upper hinge shaft to be connected rotatably relative to the first hinge block; and
      a second lower arm connected to the second lower hinge shaft to be connected rotatably relative to the second hinge block,
   wherein the hinge device further comprises a cable passage portion that is arranged side by side with the first hinge block or the second hinge block in the axial direction and through which a cable connecting the first chassis and the second chassis is passed,
   wherein the cable passage portion comprises:
      a third hinge block that supports a third upper hinge shaft that is coaxial with the first upper hinge shaft and the second upper hinge shaft in the flat plate form, and a third lower hinge shaft that is coaxial with the first lower hinge shaft and the second lower hinge shaft and is arranged with the third upper hinge shaft vertically in the flat plate form;
      a fourth hinge block that supports a fourth upper hinge shaft that is coaxial with the first upper hinge shaft and the second upper hinge shaft in the flat plate form, and a fourth lower hinge shaft that is coaxial with the first lower hinge shaft and the second lower hinge shaft and is arranged with the fourth upper hinge shaft vertically in the flat plate form;
      a third bracket that comprises a third fixing plate fixed to the first chassis, and a third lower arm connected to the third lower hinge shaft to be connected rotatably relative to the third hinge block;
      a fourth bracket that comprises a fourth fixing plate fixed to the second chassis, and a fourth upper arm connected to the third upper hinge shaft to be connected rotatably relative to the third hinge block;
      a fifth bracket that comprises a fifth fixing plate fixed to the first chassis, and a fifth lower arm connected to the fourth lower hinge shaft to be connected rotatably relative to the fourth hinge block; and
      a sixth bracket that comprises a sixth fixing plate fixed to the second chassis, and a sixth upper arm connected to the fourth upper hinge shaft to be connected rotatably relative to the fourth hinge block,
   wherein the third hinge block is located at a position between each of the third lower arm and the fourth upper arm and each of the fifth lower arm and the sixth upper arm,
   wherein the fourth hinge block is located on a side opposite to a third hinge block side of the fifth lower arm and the sixth upper arm,
   wherein the third hinge block comprises:
      a shaft support portion that is adjacent to the third lower arm and the fourth upper arm and supports the third upper hinge shaft and the third lower hinge shaft; and
      a hollow first cable passage hole that is located at a position between the shaft support portion and each of the fifth lower arm and the sixth upper arm, communicates between an upper space located on an axis of the third upper hinge shaft and a lower space located on an axis of the third lower hinge shaft, and is open to the fifth lower arm and the sixth upper arm, wherein the fifth bracket comprises a hollow second cable passage hole that communicates between the first chassis and the lower space and communicates with the first cable passage hole, and wherein the sixth bracket comprises a hollow third cable passage hole that communicates between the second chassis and the upper space and communicates with the first cable passage hole.

2. The electronic apparatus according to claim 1, wherein the hinge device comprises a plurality of sets each of which includes the first hinge block, the second hinge block, the first bracket, and the second bracket.

3. An electronic apparatus comprising:
a first chassis;
a second chassis adjacent to the first chassis;
a first display provided on an upper surface of the first chassis;
a second display provided on an upper surface of the second chassis; and
a hinge device that connects the first chassis and the second chassis so as to be relatively rotatable at least from a folded form in which the first chassis and the second chassis are disposed to overlap in a surface normal direction to a flat plate form in which the first chassis and the second chassis are arranged in a direction perpendicular to the surface normal direction,
wherein the hinge device comprises:
a first bracket comprising a first fixing plate fixed to the first chassis;
a second bracket comprising a second fixing plate fixed to the second chassis;
a first hinge block that supports a first upper hinge shaft and a first lower hinge shaft arranged vertically between adjacent end surfaces of the first chassis and the second chassis in the flat plate form; and
a second hinge block that is arranged side by side with the first hinge block in an axial direction of the first upper hinge shaft and the first lower hinge shaft, and supports a second upper hinge shaft and a second lower hinge shaft arranged vertically between the adjacent end surfaces in the flat plate form,
wherein in the flat plate form, the first upper hinge shaft and the second upper hinge shaft are coaxial,
wherein in the flat plate form, the first lower hinge shaft and the second lower hinge shaft are coaxial,
wherein the first bracket further comprises:
a first lower arm connected to the first lower hinge shaft to be connected rotatably relative to the first hinge block; and
a first upper arm connected to the second upper hinge shaft to be connected rotatably relative to the second hinge block,
wherein the second bracket further comprises:
a second upper arm connected to the first upper hinge shaft to be connected rotatably relative to the first hinge block; and
a second lower arm connected to the second lower hinge shaft to be connected rotatably relative to the second hinge block, and
wherein in the flat plate form, the first upper hinge shaft and the second upper hinge shaft each have a shaft center at a position coinciding with the upper surface of each of the first chassis and the second chassis or at a position higher than the upper surface.

4. The electronic apparatus according to claim 3, wherein the hinge device comprises a plurality of sets each of which includes the first hinge block, the second hinge block, the first bracket, and the second bracket.

5. An electronic apparatus comprising:
a first chassis;
a second chassis adjacent to the first chassis;
a first display provided on an upper surface of the first chassis;
a second display provided on an upper surface of the second chassis; and
a hinge device that connects the first chassis and the second chassis so as to be relatively rotatable at least from a folded form in which the first chassis and the second chassis are disposed to overlap in a surface normal direction to a flat plate form in which the first chassis and the second chassis are arranged in a direction perpendicular to the surface normal direction,
wherein the hinge device comprises:
a first bracket comprising a first fixing plate fixed to the first chassis;
a second bracket comprising a second fixing plate fixed to the second chassis;
a first hinge block that supports a first upper hinge shaft and a first lower hinge shaft arranged vertically between adjacent end surfaces of the first chassis and the second chassis in the flat plate form; and
a second hinge block that is arranged side by side with the first hinge block in an axial direction of the first upper hinge shaft and the first lower hinge shaft, and supports a second upper hinge shaft and a second lower hinge shaft arranged vertically between the adjacent end surfaces in the flat plate form,
wherein in the flat plate form, the first upper hinge shaft and the second upper hinge shaft are coaxial,
wherein in the flat plate form, the first lower hinge shaft and the second lower hinge shaft are coaxial,
wherein the first bracket further comprises:
a first lower arm connected to the first lower hinge shaft to be connected rotatably relative to the first hinge block; and
a first upper arm connected to the second upper hinge shaft to be connected rotatably relative to the second hinge block,
wherein the second bracket further comprises:
a second upper arm connected to the first upper hinge shaft to be connected rotatably relative to the first hinge block; and
a second lower arm connected to the second lower hinge shaft to be connected rotatably relative to the second hinge block, and
wherein in the flat plate form, the first lower hinge shaft and the second lower hinge shaft each have a shaft center at a position coinciding with a lower surface of each of the first chassis and the second chassis or at a position lower than the lower surface.

6. The electronic apparatus according to claim 5, wherein the hinge device comprises a plurality of sets each of which includes the first hinge block, the second hinge block, the first bracket, and the second bracket.

7. A hinge device configured to relatively rotatably connect a first chassis and a second chassis in an electronic apparatus, the hinge device comprising:
a first bracket comprising a first fixing plate configured to be fixed to the first chassis;

a second bracket comprising a second fixing plate configured to be fixed to the second chassis, the second fixing plate being rotatable relative to the first fixing plate at least from a folded form in which the first chassis and the second chassis are disposed to overlap in a surface normal direction to a flat plate form in which the first chassis and the second chassis are arranged in a direction perpendicular to the surface normal direction;

a first hinge block that supports a first upper hinge shaft and a first lower hinge shaft arranged vertically in the flat plate form; and a second hinge block that is arranged side by side with the first hinge block in an axial direction of the first upper hinge shaft and the first lower hinge shaft, and supports a second upper hinge shaft and a second lower hinge shaft arranged vertically in the flat plate form, wherein in the flat plate form, the first upper hinge shaft and the second upper hinge shaft are coaxial, wherein in the flat plate form, the first lower hinge shaft and the second lower hinge shaft are coaxial, wherein the first bracket further comprises:
  a first lower arm connected to the first lower hinge shaft to be connected rotatably relative to the first hinge block; and
  a first upper arm connected to the second upper hinge shaft to be connected rotatably relative to the second hinge block, and wherein the second bracket further comprises:
  a second upper arm connected to the first upper hinge shaft to be connected rotatably relative to the first hinge block; and
  a second lower arm connected to the second lower hinge shaft to be connected rotatably relative to the second hinge block, wherein the hinge device further comprises:
  a cable passage portion that is arranged side by side with the first hinge block or the second hinge block in the axial direction, and through which a cable connecting the first chassis and the second chassis is to be passed, wherein the cable passage portion comprises:
  a third hinge block that supports a third upper hinge shaft that is coaxial with the first upper hinge shaft and the second upper hinge shaft in the flat plate form, and a third lower hinge shaft that is coaxial with the first lower hinge shaft and the second lower hinge shaft and is arranged with the third upper hinge shaft vertically in the flat plate form;
  a fourth hinge block that supports a fourth upper hinge shaft that is coaxial with the first upper hinge shaft and the second upper hinge shaft in the flat plate form, and a fourth lower hinge shaft that is coaxial with the first lower hinge shaft and the second lower hinge shaft and is arranged with the fourth upper hinge shaft vertically in the flat plate form;
  a third bracket that comprises a third fixing plate fixed to the first chassis, and a third lower arm connected to the third lower hinge shaft to be connected rotatably relative to the third hinge block;
  a fourth bracket that comprises a fourth fixing plate fixed to the second chassis, and a fourth upper arm connected to the third upper hinge shaft to be connected rotatably relative to the third hinge block;
  a fifth bracket that comprises a fifth fixing plate fixed to the first chassis, and a fifth lower arm connected to the fourth lower hinge shaft to be connected rotatably relative to the fourth hinge block; and
  a sixth bracket that comprises a sixth fixing plate fixed to the second chassis, and a sixth upper arm connected to the fourth upper hinge shaft to be connected rotatably relative to the fourth hinge block, wherein the third hinge block is located at a position between each of the third lower arm and the fourth upper arm and each of the fifth lower arm and the sixth upper arm, wherein the fourth hinge block is located on a side opposite to a third hinge block side of the fifth lower arm and the sixth upper arm, wherein the third hinge block comprises:
  a shaft support portion that is adjacent to the third lower arm and the fourth upper arm and supports the third upper hinge shaft and the third lower hinge shaft; and
  a hollow first cable passage hole that is located at a position between the shaft support portion and each of the fifth lower arm and the sixth upper arm, communicates between an upper space located on an axis of the third upper hinge shaft and a lower space located on an axis of the third lower hinge shaft, and is open to the fifth lower arm and the sixth upper arm, wherein the fifth bracket comprises a hollow second cable passage hole that communicates between the first chassis and the lower space and communicates with the first cable passage hole, and wherein the sixth bracket comprises a hollow third cable passage hole that communicates between the second chassis and the upper space and communicates with the first cable passage hole.

8. A hinge device configured to relatively rotatably connect a first chassis and a second chassis in an electronic apparatus, the hinge device comprising:
  a first bracket comprising a first fixing plate configured to be fixed to the first chassis;
  a second bracket comprising a second fixing plate configured to be fixed to the second chassis, the second fixing plate being rotatable relative to the first fixing plate at least from a folded form in which the first chassis and the second chassis are disposed to overlap in a surface normal direction to a flat plate form in which the first chassis and the second chassis are arranged in a direction perpendicular to the surface normal direction;
  a first hinge block that supports a first upper hinge shaft and a first lower hinge shaft arranged vertically in the flat plate form; and
  a second hinge block that is arranged side by side with the first hinge block in an axial direction of the first upper hinge shaft and the first lower hinge shaft, and supports a second upper hinge shaft and a second lower hinge shaft arranged vertically in the flat plate form, wherein in the flat plate form, the first upper hinge shaft and the second upper hinge shaft are coaxial, wherein in the flat plate form, the first lower hinge shaft and the second lower hinge shaft are coaxial, wherein the first bracket further comprises:
  a first lower arm connected to the first lower hinge shaft to be connected rotatably relative to the first hinge block; and
  a first upper arm connected to the second upper hinge shaft to be connected rotatably relative to the second hinge block, wherein the second bracket further comprises:
   a second upper arm connected to the first upper hinge shaft to be connected rotatably relative to the first hinge block; and
   a second lower arm connected to the second lower hinge shaft to be connected rotatably relative to the second hinge block, and
wherein in the flat plate form, the first upper hinge shaft and the second upper hinge shaft each have a shaft center at a position coinciding with a surface of each of the first chassis and the second chassis or at a position higher than the surface.

9. The hinge device according to claim 8, further comprising:
   a cable passage portion that is arranged side by side with the first hinge block or the second hinge block in the axial direction, and through which a cable connecting the first chassis and the second chassis is to be passed.

10. A hinge device configured to relatively rotatably connect a first chassis and a second chassis in an electronic apparatus, the hinge device comprising:
   a first bracket comprising a first fixing plate configured to be fixed to the first chassis;
   a second bracket comprising a second fixing plate configured to be fixed to the second chassis, the second fixing plate being rotatable relative to the first fixing plate at least from a folded form in which the first chassis and the second chassis are disposed to overlap in a surface normal direction to a flat plate form in which the first chassis and the second chassis are arranged in a direction perpendicular to the surface normal direction;
   a first hinge block that supports a first upper hinge shaft and a first lower hinge shaft arranged vertically in the flat plate form; and
   a second hinge block that is arranged side by side with the first hinge block in an axial direction of the first upper hinge shaft and the first lower hinge shaft, and supports a second upper hinge shaft and a second lower hinge shaft arranged vertically in the flat plate form,
wherein in the flat plate form, the first upper hinge shaft and the second upper hinge shaft are coaxial,
wherein in the flat plate form, the first lower hinge shaft and the second lower hinge shaft are coaxial,
wherein the first bracket further comprises:
   a first lower arm connected to the first lower hinge shaft to be connected rotatably relative to the first hinge block; and
   a first upper arm connected to the second upper hinge shaft to be connected rotatably relative to the second hinge block,
wherein the second bracket further comprises:
   a second upper arm connected to the first upper hinge shaft to be connected rotatably relative to the first hinge block; and
   a second lower arm connected to the second lower hinge shaft to be connected rotatably relative to the second hinge block, and
wherein in the flat plate form, the first lower hinge shaft and the second lower hinge shaft each have a shaft center at a position coinciding with a lower surface of each of the first chassis and the second chassis or at a position lower than the lower surface.

11. The hinge device according to claim 10, further comprising:
   a cable passage portion that is arranged side by side with the first hinge block or the second hinge block in the axial direction, and through which a cable connecting the first chassis and the second chassis is to be passed.

* * * * *